United States Patent
Lee et al.

(10) Patent No.: US 12,470,702 B2
(45) Date of Patent: *Nov. 11, 2025

(54) IMAGE ENCODING/DECODING METHOD AND DEVICE USING MFM INDICATOR AND MPM INDICATOR, AND RECORDING MEDIUM IN WHICH BITSTREAM IS STORED

(71) Applicants: Electronics and Telecommunications Research Institute, Daejeon (KR); INDUSTRY-UNIVERSITY COOPERATION FOUNDATION KOREA AEROSPACE UNIVERSITY, Goyang-si (KR); INDUSTRY ACADEMY COOPERATION FOUNDATION OF SEJONG UNIVERSITY, Seoul (KR)

(72) Inventors: Jin Ho Lee, Daejeon (KR); Jung Won Kang, Daejeon (KR); Ha Hyun Lee, Seoul (KR); Sung Chang Lim, Daejeon (KR); Hui Yong Kim, Daejeon (KR); Jae Gon Kim, Goyang-si (KR); Ji Hoon Do, Busan (KR); Yong Uk Yoon, Jeju-si (KR); Do Hyeon Park, Goyang-si (KR); Yung Lyul Lee, Seoul (KR)

(73) Assignees: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR); INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 44 days.

This patent is subject to a terminal disclaimer.

(21) Appl. No.: 18/495,579

(22) Filed: Oct. 26, 2023

(65) Prior Publication Data
US 2024/0064295 A1     Feb. 22, 2024

Related U.S. Application Data

(63) Continuation of application No. 17/258,124, filed as application No. PCT/KR2019/008260 on Jul. 5, 2019, now Pat. No. 11,818,340.

(30) Foreign Application Priority Data

Jul. 6, 2018    (KR) .................. 10-2018-0078553
Sep. 20, 2018  (KR) .................. 10-2018-0112725
(Continued)

(51) Int. Cl.
*H04N 19/11*     (2014.01)
*H04N 19/105*    (2014.01)
(Continued)

(52) U.S. Cl.
CPC .......... *H04N 19/11* (2014.11); *H04N 19/105* (2014.11); *H04N 19/176* (2014.11);
(Continued)

(58) Field of Classification Search
CPC .... H04N 19/11; H04N 19/105; H04N 19/176; H04N 19/184; H04N 19/186;
(Continued)

(56) References Cited

U.S. PATENT DOCUMENTS

2012/0307894 A1   12/2012   Chien et al.
2012/0328009 A1   12/2012   Sasai et al.
(Continued)

FOREIGN PATENT DOCUMENTS

KR   1020130034559 A   4/2013
KR   1020150059141 A   5/2015
(Continued)

OTHER PUBLICATIONS

Yu et al., "On MPM determination and Planar mode signaling", Joint Collaborative Team on Video Coding (JCT-VC) of ITU-T SG16 WP3 and ISO/IEC JTC1/SC29/WG11, Motorola Mobility Inc., JCTVC-H0516-r3, Feb. 1-10, 2012, pp. 1-6.
(Continued)

*Primary Examiner* — Matthew K Kwan
(74) *Attorney, Agent, or Firm* — Sughrue Mion, PLLC

(57) ABSTRACT

There is provided an image encoding/decoding method and apparatus. An image decoding method according to the present invention may comprise reconstructing a most frequent mode (MFM) indicator indicating whether or not an intra prediction mode of a current block is a predetermined intra prediction mode, deriving, on the basis of the MFM indicator, the intra prediction mode of the current block, and
(Continued)

generating a prediction block of the current block by performing intra prediction on the current block on the basis of the intra prediction mode.

5 Claims, 27 Drawing Sheets

(30) Foreign Application Priority Data

Dec. 27, 2018 (KR) .................. 10-2018-0170437
May 7, 2019 (KR) .................. 10-2019-0053116

(51) Int. Cl.
| | |
|---|---|
| *H04N 19/119* | (2014.01) |
| *H04N 19/176* | (2014.01) |
| *H04N 19/184* | (2014.01) |
| *H04N 19/186* | (2014.01) |
| *H04N 19/593* | (2014.01) |
| *H04N 19/70* | (2014.01) |
| *H04N 19/96* | (2014.01) |

(52) U.S. Cl.
CPC ......... *H04N 19/184* (2014.11); *H04N 19/186* (2014.11); *H04N 19/593* (2014.11); *H04N 19/119* (2014.11); *H04N 19/70* (2014.11); *H04N 19/96* (2014.11)

(58) Field of Classification Search
CPC .... H04N 19/593; H04N 19/119; H04N 19/70; H04N 19/96; H04N 19/132

USPC .................................................. 375/240.12
See application file for complete search history.

(56) References Cited

U.S. PATENT DOCUMENTS

| | | | |
|---|---|---|---|
| 2014/0226717 A1* | 8/2014 | Lim | ..................... H04N 19/124 |
| | | | 375/240.12 |
| 2016/0142734 A1 | 5/2016 | Kim et al. | |
| 2020/0007862 A1 | 1/2020 | Lin et al. | |
| 2020/0120336 A1* | 4/2020 | Racape | ................. H04N 19/91 |
| 2020/0195920 A1 | 6/2020 | Racape et al. | |

FOREIGN PATENT DOCUMENTS

| | | |
|---|---|---|
| KR | 1020170126918 A | 11/2017 |
| KR | 1020180046876 A | 5/2018 |
| WO | 2017196957 A1 | 11/2017 |

OTHER PUBLICATIONS

Yu et al., "Non-EE1: Priority List Based Intra Mode Coding with 5 MPM", Joint Video Exploration Team (JVET) of ITU-T SG 16 WP 3 and ISO/IEC JTC 1/SC 29/WG 11, Arris, JVET-H0051, Oct. 18-25, 2017, pp. 1-5.

Li et al., "Multiple line-based intra prediction", Joint Video Exploration Team (JVET) of ITU-T SG 16 WP 3 and ISO/IEC JTC 1/SC 29/WG 11, Peking University/Microsoft Corp., JVET-C0071, May 26-Jun. 1, 2016, pp. 1-6.

* cited by examiner

IMAGE ENCODING/DECODING METHOD AND DEVICE USING MFM INDICATOR AND MPM INDICATOR, AND RECORDING MEDIUM IN WHICH BITSTREAM IS STORED

CROSS-REFERENCE TO RELATED APPLICATIONS

The present application is a continuation application of U.S. application Ser. No. 17/258,124, filed on Jan. 5, 2021, which was the National Stage of International Application No. PCT/KR2019/008260, filed on Jul. 5, 2019, and claims priority under 35 U.S.C. § 119(a) to Korean Patent Applications: KR10-2018-0078553, filed on Jul. 6, 2018, KR10-2018-0112725, filed on Sep. 20, 2018, KR10-2018-0170437, filed on Dec. 27, 2018, and KR10-2019-0053116, filed on May 7, 2019, with the Korean Intellectual Property Office, which are incorporated herein by reference in their entirety.

TECHNICAL FIELD

The present invention relates to an image encoding/decoding method and apparatus. More particularly, the present invention relates to an image encoding/decoding method and apparatus including intra prediction mode encoding or inter color component prediction.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

As the number of intra prediction modes increases, bit overhead for signaling the prediction modes increases. The conventional codec constructs and uses a most probable mode (MPM) list for effectively signaling an intra prediction mode of a current block. The MPM list is composed of candidate prediction modes that are capable of representing the intra prediction mode of the current block well in a probabilistic manner, and fewer bins are assigned to the intra prediction modes included in the MPM list, whereby more effective signaling is achieved.

The MPM list includes a mode of a neighboring block at a determined position, as a candidate mode. However, as block partitioning is diversified, the prediction mode of the neighboring block is also diversified. Therefore, the mode derived from a determined position may not actually be a mode that most frequently occurs in a probabilistic manner.

Further, the position from which a current MPM candidate is derived is a position of a relatively close neighboring block, so that the MPM candidates may not include various candidates.

Further, as a resolution increases, the probability of occurrence of a particular mode also increases and the number of bins to be assigned to modes except for the particular mode also increases, which may be inefficient for encoding.

In constructing the MPM list, indexes of the prediction modes are assigned differently depending on the size/shape of the neighboring block, so that the candidate list for the current block may be composed of modes having low correlation with the neighboring block.

In inter color component prediction, a fixed and limited reference sample is used to predict a linear prediction model regardless of the size, the shape of the current block, the neighboring mode, or the like, and then this model is used to predict a chroma signal from a luma signal, which may result degradation of performance of inter color component prediction.

In estimating the linear model for inter color component prediction, deriving the linear prediction model by only using the minimum/maximum value of the luma component may result degradation of performance of inter color component prediction.

MODE FOR INVENTION

Technical Problem

An object of the present invention is to provide an image encoding/decoding method and apparatus with improved encoding/decoding efficiency.

Another object of the present invention is to provide an image encoding/decoding method and apparatus performing intra prediction mode encoding having improved performance.

Another object of the present invention is to provide an image encoding/decoding method and apparatus performing inter color component prediction having improved performance.

Another object of the present invention is to provide a recording medium storing a bitstream generated by an image encoding method/apparatus of the present invention.

Another object of the present invention is to provide a recording medium storing a bitstream which is received, decoded and used by an image decoding apparatus according to the present invention to reconstruct an image.

Technical Solution

An image decoding method according to an embodiment of the present invention may comprise reconstructing a most frequent mode (MFM) indicator indicating whether or not an intra prediction mode of a current block is a predetermined intra prediction mode, deriving, on the basis of the MFM indicator, the intra prediction mode of the current block, and generating a prediction block of the current block by performing intra prediction on the current block on the basis of the intra prediction mode In the image decoding method according to the present invention, the predetermined intra prediction mode may be a Planar mode.

In the image decoding method according to the present invention, when the MFM indicator has a first value, the intra prediction mode of the current block may be derived to be the predetermined intra prediction mode.

In the image decoding method according to the present invention, when the MFM indicator has a second value, a most probable mode (MPM) list may be constructed on the basis of intra prediction modes of neighboring blocks of the current block and the intra prediction mode of the current block may be derived on the basis of the MPM list.

In the image decoding method according to the present invention, the MPM list may be constructed so as not to include the predetermined intra prediction mode.

In the image decoding method according to the present invention, the neighboring blocks of the current block may include at least one among a top right block of the current block and a bottom left block of the current block.

In the image decoding method according to the present invention, when the intra prediction mode of the neighboring block is unavailable, the unavailable intra prediction mode of the neighboring block may be set to be a Planar mode.

In the image decoding method according to the present invention, the MPM list may include five MPM candidates.

In the image decoding method according to the present invention, the method may further comprise reconstructing an MPM indicator indicating whether or not the intra prediction mode of the current block is included in the MPM list, and only when the MPM indicator has a first value, the MFM indicator may be reconstructed from a bitstream.

In the image decoding method according to the present invention, one among multiple reference sample lines may be selected to perform the intra prediction, and only when the selected reference sample line is the first reference sample line, filtering may be performed on the reference sample line.

An image encoding method according to another embodiment of the present invention may comprise determining an intra prediction mode of a current block, generating a prediction block of the current block by performing intra prediction on the current block on the basis of the intra prediction mode, deciding whether or not the intra prediction mode of the current block is a predetermined intra prediction mode, and encoding, on the basis of a result of the decision, a most frequent mode (MFM) indicator.

In the image encoding method according to the present invention, the predetermined intra prediction mode may be a Planar mode.

In the image encoding method according to the present invention, when the intra prediction mode of the current block is the predetermined intra prediction mode, the MFM indicator may be encoded as a first value.

In the image encoding method according to the present invention, when the intra prediction mode of the current block is not the predetermined intra prediction mode, the MFM indicator may be encoded as a second value, a most probable mode (MPM) list may be constructed on the basis of intra prediction modes of neighboring blocks of the current block and the intra prediction mode of the current block may be encoded on the basis of the MPM list.

In the image encoding method according to the present invention, the MPM list may be constructed so as not to include the predetermined intra prediction mode.

In the image encoding method according to the present invention, the neighboring blocks of the current block may include at least one among a top right block of the current block and a bottom left block of the current block.

In the image encoding method according to the present invention, when the intra prediction mode of the neighboring block is unavailable, the unavailable intra prediction mode of the neighboring block may be set to be a Planar mode.

In the image encoding method according to the present invention, the method may further comprise encoding an MPM indicator indicating whether or not the intra prediction mode of the current block is included in the MPM list, and wherein only when the MPM indicator has a first value, the MFM indicator may be encoded.

A computer-readable recording medium according to another embodiment of the present invention may be a computer-readable recording medium storing a bitstream which is received, decoded and used to reconstruct an image by an image decoding apparatus, the bitstream may comprise a most frequent mode (MEM) indicator indicating whether or not an intra prediction mode of a current block is a predetermined intra prediction mode, the MFM indicator may be used to derive the intra prediction mode of the current block, and the intra prediction mode may be used to generate a prediction block of the current block by performing intra prediction on the current block.

A computer-readable recording medium according to another embodiment of the present invention may store a bitstream generated by an image encoding method and/or apparatus according to the present invention.

Advantageous Effects

According to the present invention, an image encoding/decoding method and apparatus with improved encoding/decoding efficiency may be provided.

According to the present invention, an image encoding/decoding method and apparatus performing intra prediction mode encoding having improved performance may be provided.

According to the present invention, an image encoding/decoding method and apparatus performing inter color component prediction having improved performance may be provided.

According to the present invention, a recording medium storing a bitstream generated by an image encoding method/apparatus of the present invention may be provided.

According to the present invention, a recording medium storing a bitstream which is received, decoded and used by an image decoding apparatus according to the present invention to reconstruct an image may be provided.

DESCRIPTION OF DRAWINGS

FIG. 11 is a diagram illustrating a spatially neighboring block of a current block.

FIG. 19 is a diagram illustrating a method of constructing a linear model depending on the prediction mode of the neighboring block.

MODE FOR INVENTION

Figure 1:
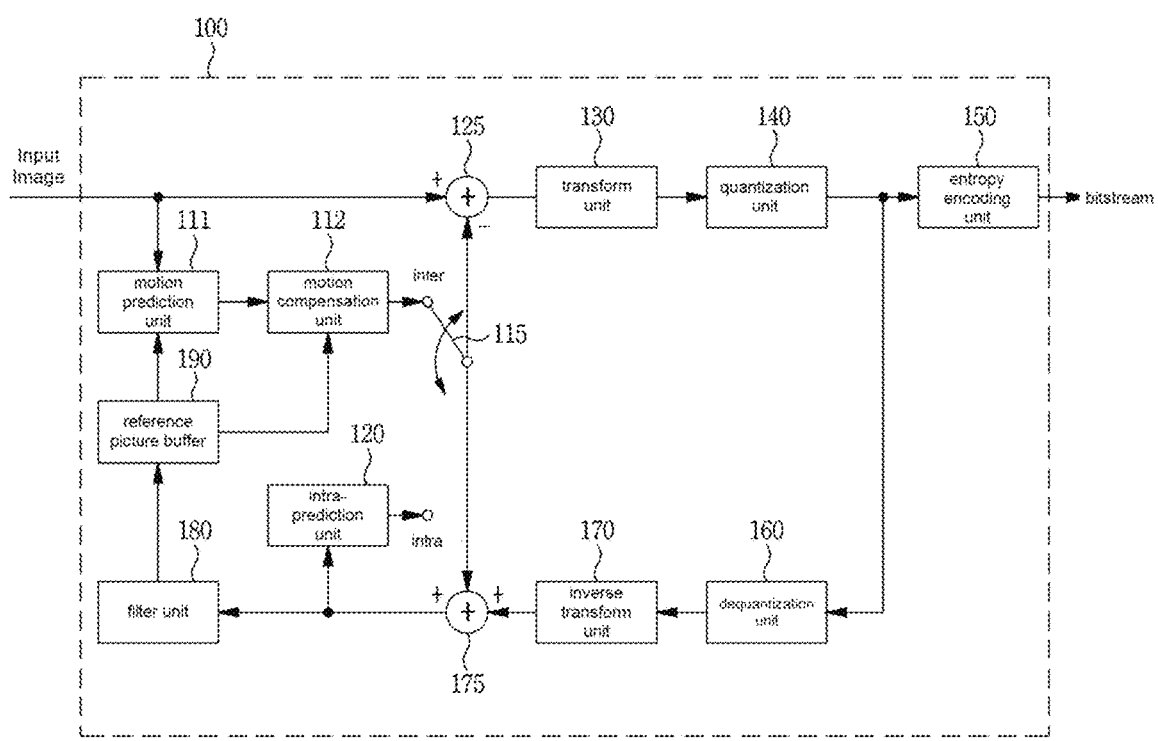
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be MxN. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both.

In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
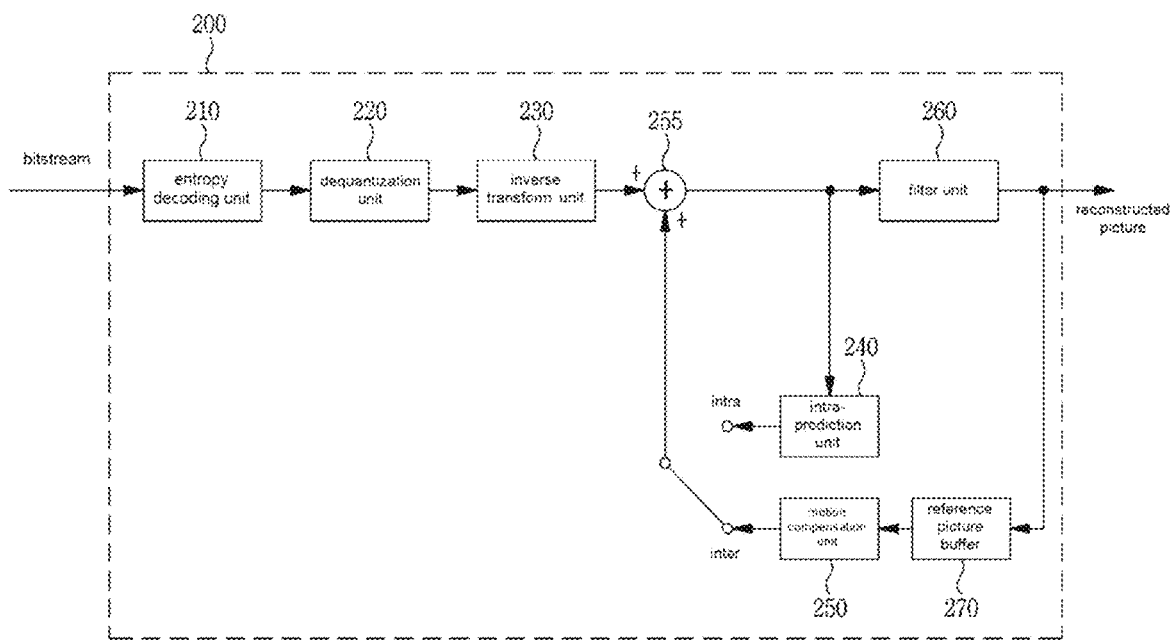
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
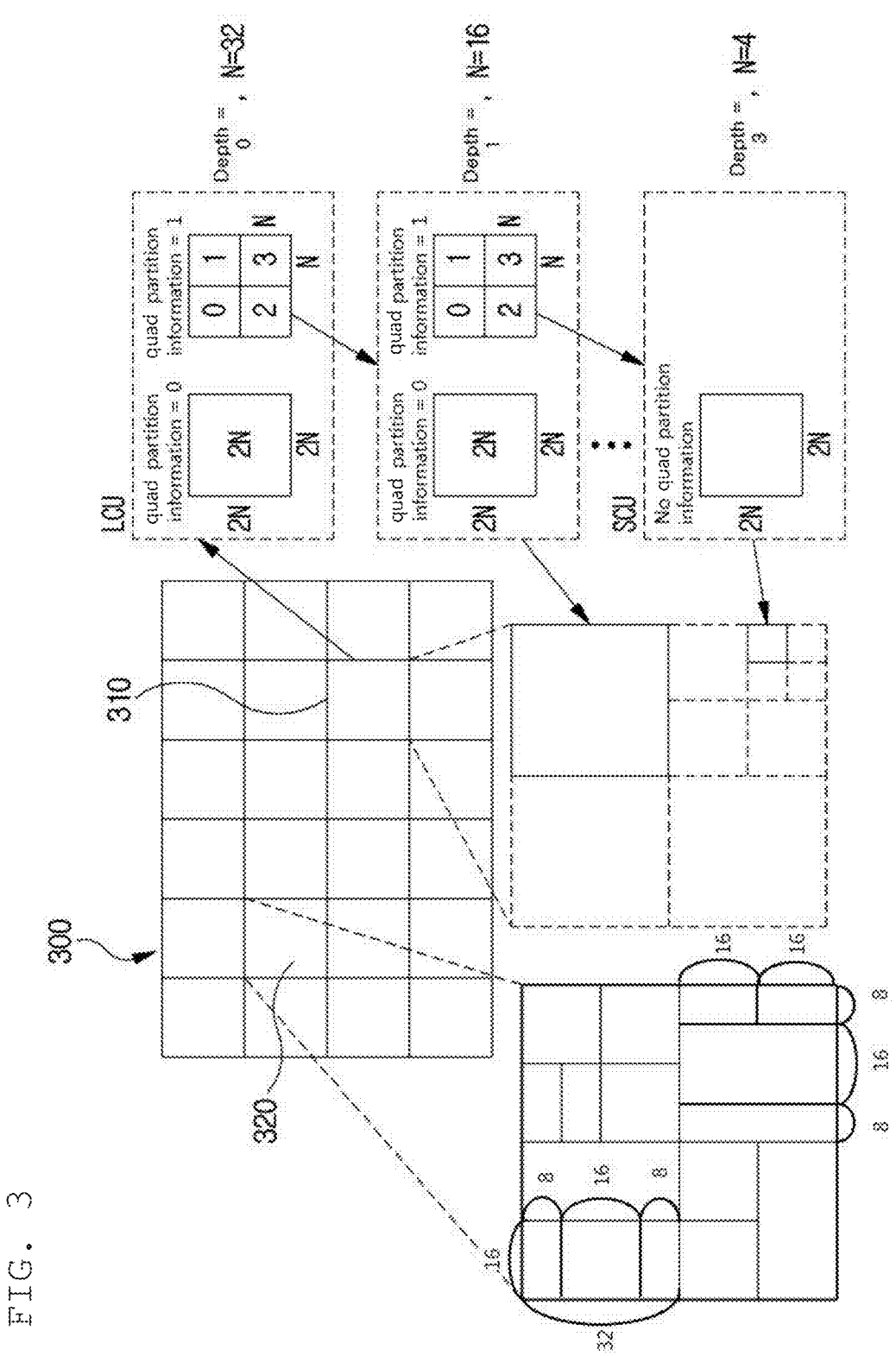
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned.

Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

- N×M (N and/or M is 128) Ternary tree partitioning for coding units
- 128×N (N<=64) Binary tree partitioning in horizontal direction for coding units
- N×128 (N<=64) Binary tree partitioning in vertical direction for coding units Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding unit corresponding to a node of a multi-type tree, the partition tree information may be signaled. Otherwise, the partition tree information may not be signaled but be deduced from a value indicating a possible partitioning tree structure.

Figure 4:
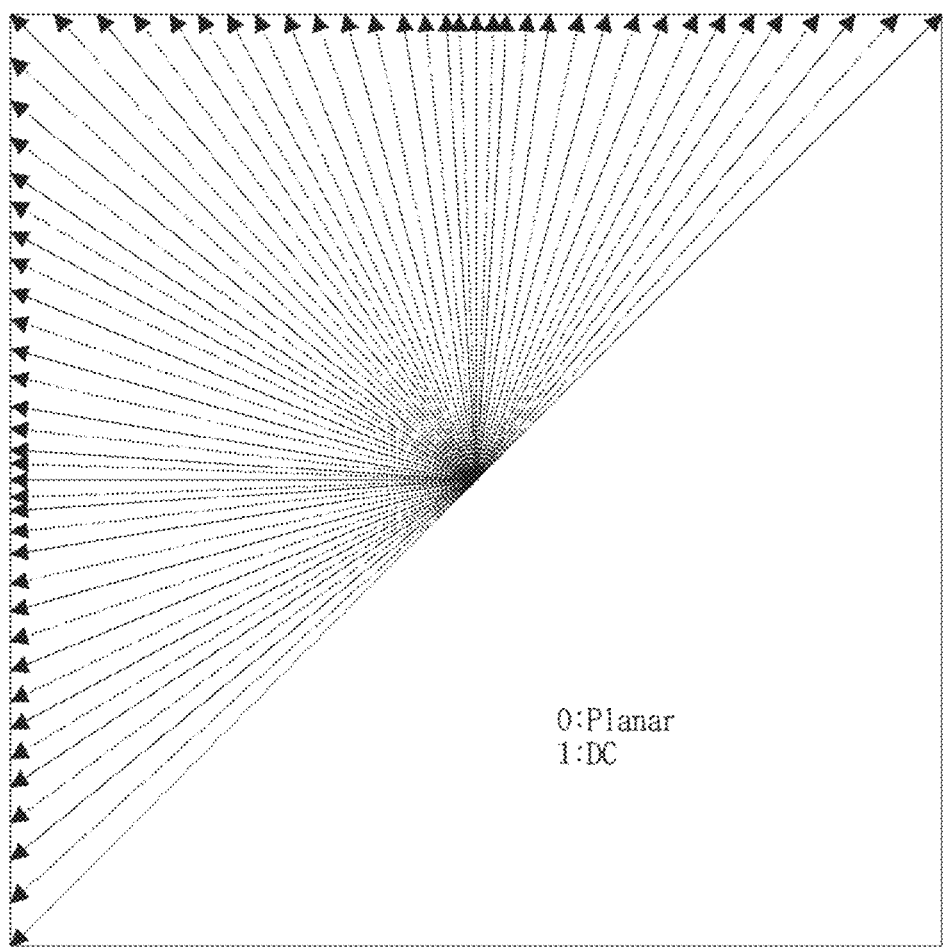
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
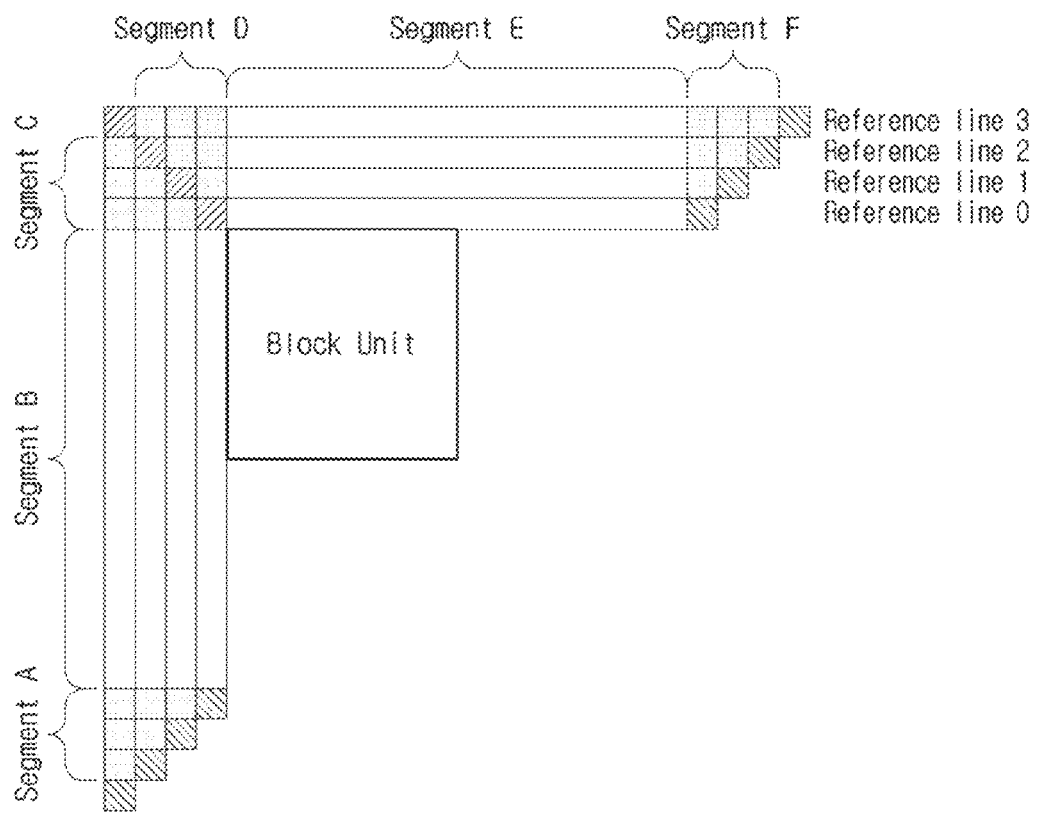
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
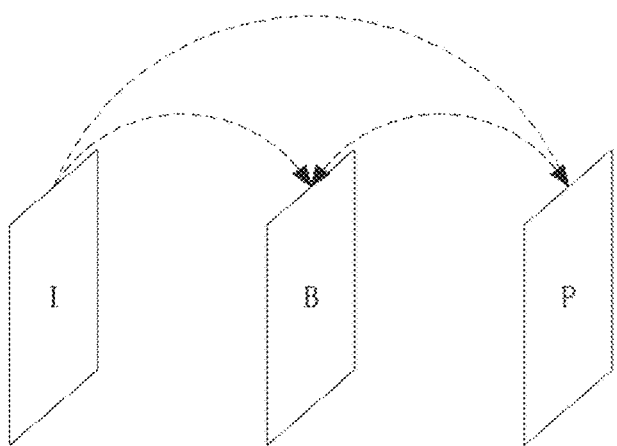
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
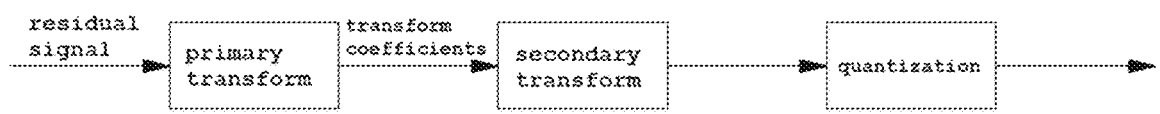
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block) The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to MxN (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
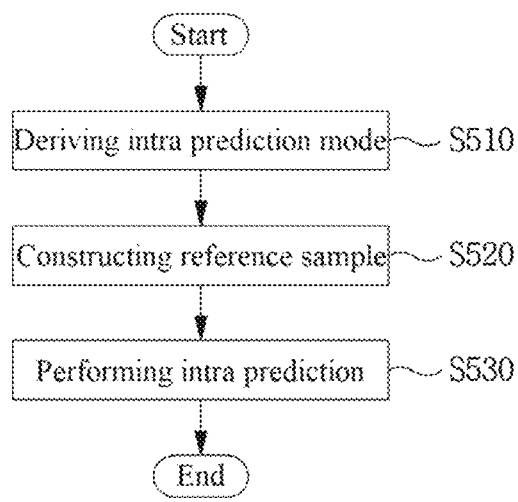
FIG. 8 is a diagram illustrating intra prediction encoding/decoding according to an embodiment of the present invention.

FIG. 8 is a diagram illustrating intra prediction encoding/decoding according to an embodiment of the present invention.

At step S510, an intra prediction mode may be derived.

The intra prediction mode for the current block may be derived using at least one method of the following methods: a derivation method using predetermined modes (N modes) and/or an intra prediction mode of a neighboring block; a method of entropy encoding/decoding an intra prediction mode of a current block; and a method of deriving a prediction mode adaptively depending on a slice type.

Intra prediction mode may include various modes, such as DC, Planar, position dependent intra prediction combination (PDPC), linear model (LM), angular prediction, current picture referencing (CPR) modes, and the like.

The size of the current block may be represented by W×H, and W and H each may have a value of $a \cdot 2^n$ ($a=1, 2, 3, \ldots, n=0, 1, 2, 3, 4, \ldots$) that is a positive integer.

The intra prediction mode of the current block may be derived using a predetermined intra prediction mode and/or an intra prediction mode of a neighboring block.

The predetermined intra prediction mode may include N modes selected from available intra prediction modes. Herein, N may be a positive integer including 1.

The neighboring block may be a neighboring block spatially/temporally adjacent to the current block.

The predetermined intra prediction mode and/or the intra prediction mode of the neighboring block may be used to construct a most frequent mode (MFM). The MFM may include one or N intra prediction modes. In deriving the MFMs, the number of MFMs and/or a method of deriving the MFMs may vary on the basis of at least one among the size, the shape, the color component, and the slice type of the current block.

The MFM may be derived from neighboring blocks.

When N intra prediction modes are derived from the neighboring blocks, N MFMs are derived on a per-subblock basis.

For example, N MFMs may be derived by searching for patterns of the neighboring blocks, and may be used as prediction modes.

For example, a particular mode may be defined as the MFM according to a gradient value of the neighboring blocks, and may be used as the prediction mode.

For example, N MFMs may be derived by searching for the prediction modes of the neighboring blocks, and may be used as the prediction modes.

Figure 9:
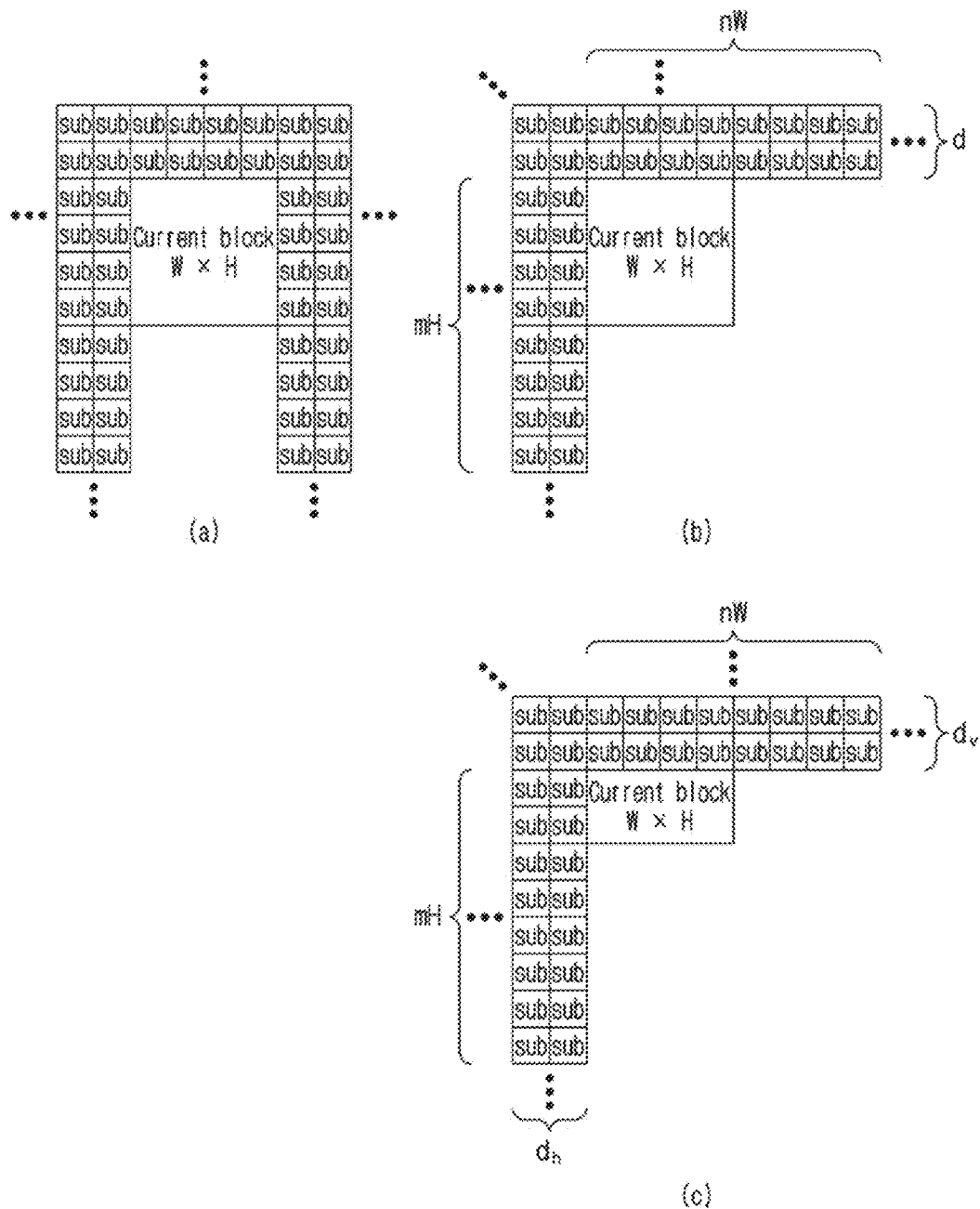
FIG. 9 is a diagram illustrating a method of deriving an intra prediction mode by using a subblock.

FIG. 9 is a diagram illustrating a method of deriving an intra prediction mode by using a subblock.

The subblocks may be present at the left side, at the top, and the right side of the current block as shown in (a) of FIG. 9. Hereinafter, an example in which subblocks are present at the left side and the top of the current block will be described.

The size of the subblock may be equal to or greater than the size of the smallest CU. The size of the subblock may be represented by $W_{sub} \times H_{sub}$, and $W_{sub}$ and $H_{sub}$ each may have a value of $a \cdot 2^n$ ($a=1, 2, 3, \ldots, n=0, 1, 2, 3, 4, \ldots$) that is a positive integer.

A search range for the subblock may be determined variously depending on the size and/or the shape of the current block. The searching may refer to deriving the intra prediction modes of one or more neighboring subblocks.

(b) of FIG. 9 shows an example in which the current block is in a 16×16 size and the subblock is in a 4×4 size. (c) of FIG. 9 shows an example in which the current block is in a 16×8 size and the subblock is in a 4×4 size. However, the size of the current block and the size of the subblock are not limited to the above examples.

In the examples shown in (b) and (c) of FIG. 9, when the current block is in a W×H size, the number of subblocks to be searched to derive the intra prediction mode may be (nW×nH+1) or $d \times (nW \times mH) + d^2$ ($n=0, 1, 2, 3, \ldots, m=0, 1, 2, 3, \ldots, d=0, 1, 2, 3, \ldots$).

In the example shown in (c) of FIG. 9, when the current block is in a rectangular shape, n>m, n<m, or n=m may be possible. Further, $d_v > d_h$, $d_v < d_h$, or $d_v = d_h$ may be possible.

The sizes of the subblocks and/or the search ranges for the subblocks may vary according to the color component. For example, with respect to the chroma block, the subblocks that have been used for the luma block may be subjected to subsampling with a ratio of 1:x (x=1, 2, 3, . . . ) and then may be used.

Among the intra prediction modes derived from the one or more neighboring blocks, a predetermined mode may be derived as the MFM. The predetermined mode may refer to at least one among a mode with the highest frequency of occurrence, a mode corresponding to a neighboring block at a predetermined position, and a combination of one or more intra prediction modes. On the basis of at least one among the size/shape of the current block, the size/shape of the neighboring block, and the intra prediction mode of the neighboring block, the method of deriving the MFM may vary.

Figure 10:
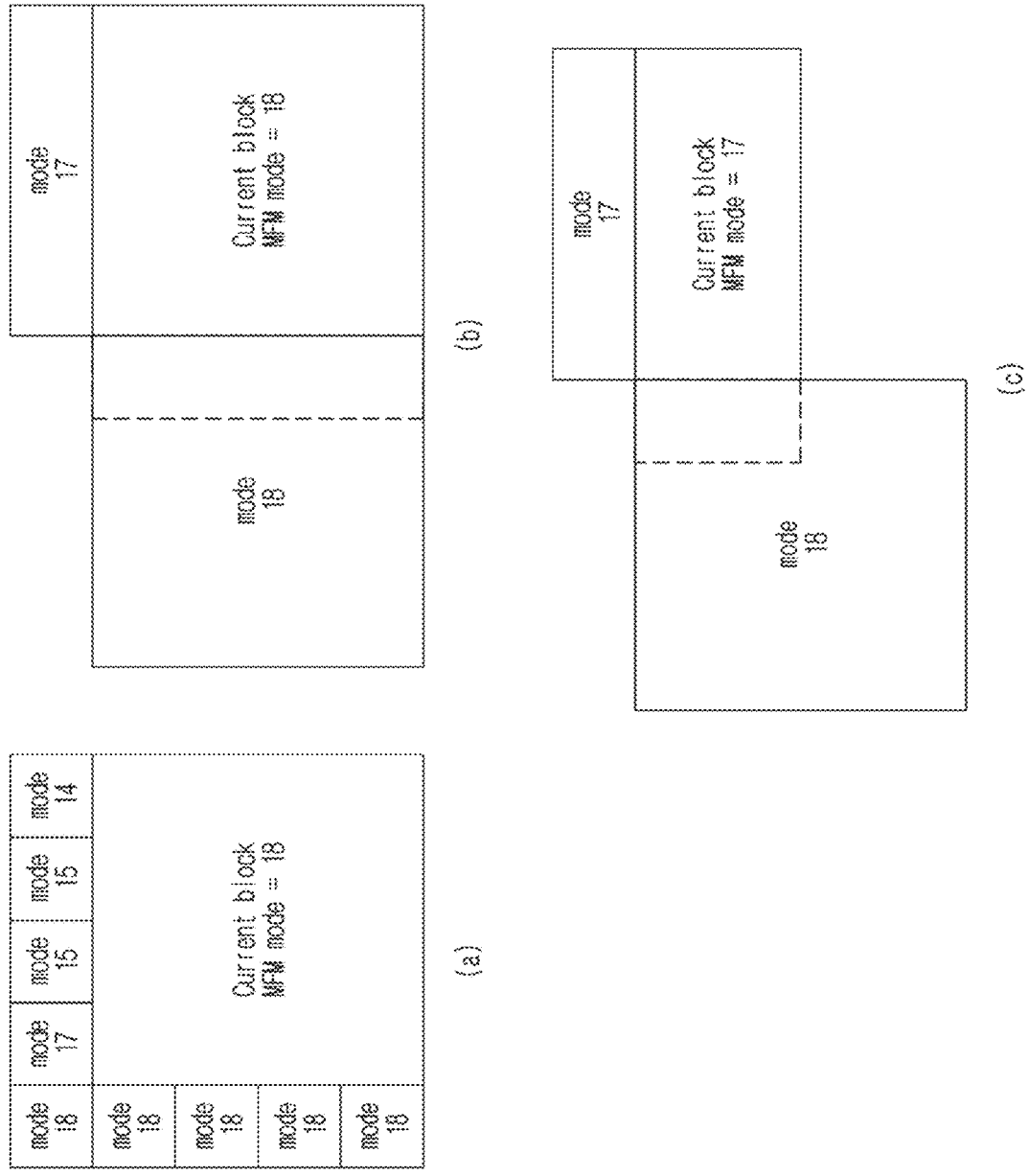
FIG. 10 is a diagram illustrating an example of determining an MFM.

FIG. 10 is a diagram illustrating an example of determining an MFM.

In (a) to (c) of FIG. 10, n, m, and d all have values of 1.

In (a) of FIG. 10, the mode with the highest frequency of occurrence is mode 18. In this case, the MFM may be derived to be mode 18.

In the example shown in (b) of FIG. 10, on the basis of the size of at least one among a CTU, a CU, a PU, and a TU, which include a neighboring block, the method of deriving the MFM may vary. For example, when the modes derived from subblocks have the same frequency, the MFM is derived by varying the weighting factors depending on the size of the neighboring block. For example, in the example shown in (b) of FIG. 10, by applying a high weighting factor to a block of which a neighboring block is in a large size, mode 18 may be derived as the MFM. Alternatively, by applying a high weighting factor to a block of which a neighboring block is in a small size, mode 17 may be derived as the MFM.

In the example shown in (c) of FIG. 10, the size of the neighboring block is the same as that in the example shown in (b) of FIG. 10, but the current block is in a rectangular shape. In this case, among the prediction modes derived on a per-subblock basis, the mode with the highest frequency of occurrence is mode 17, so that the MFM may be derived to be mode 17.

The most probable mode (MPM) may be constructed to derive the intra prediction mode of the current block. The above-described MFM may be excluded from the MPM candidate list. For example, when the MFM is mode 18, the MPM candidate list excluding mode 18 is constructed.

An indicator indicating whether or not the intra prediction mode of the current block is the MFM may be encoded/decoded. For example, when an MFM indicator has a first value (for example, "1"), the derived MFM is set to be the intra prediction mode of the current block.

When there are two or more MFMs, further MFM indexes are encoded/decoded. The MFM index may be an index indicating one among N MFMs.

When the MFM indicator has a second value (for example, "0"), an MPM indicator is encoded/decoded. The MPM indicator may be an indicator indicating whether or not the intra prediction mode of the current block is the MPM.

In predicting the mode on a per-subblock basis, the intra prediction mode may be derived from a partial position of an already encoded/decoded neighboring block.

The partial position of the neighboring block may be determined depending on at least one among a slice type, a color component, a size/shape of a block.

Figure 14:
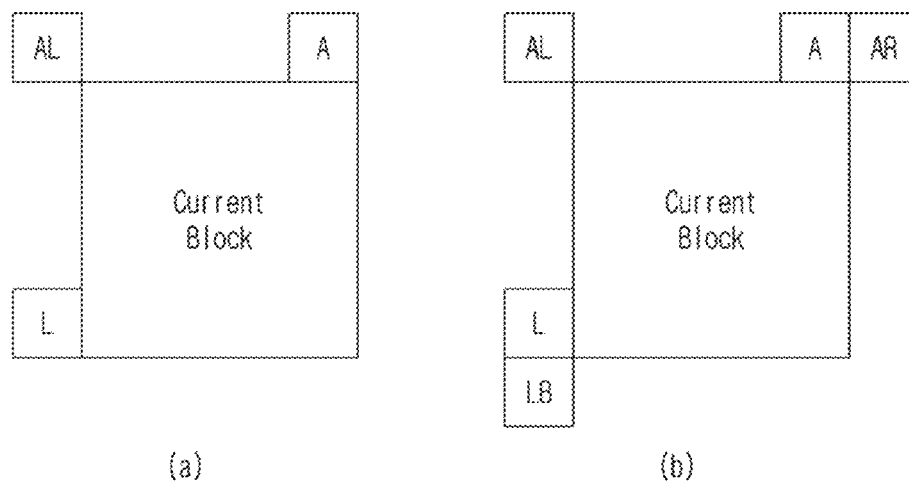
FIG. 14 is a diagram illustrating a partial position of a neighboring block.

FIG. 14 is a diagram illustrating a partial position of a neighboring block.

As shown in (a) of FIG. 14, the partial positions may be L, A, and AL. On the basis of the partial positions, the above-described method of deriving the MFM may be applied.

Alternatively, as shown in (b) of FIG. 14, the partial positions may be L, A, AR, LB, and AL.

When a slice including the current block is slice I, the MFM is derived at the position shown in (a) of FIG. 14 or 14 (b) or at a predetermined designated position. When the slice is slice P or B, the position of the neighboring block is varied.

When the current block is a luma block, the MFM is derived at the position shown in (a) or (b) of FIG. 14 or at a predetermined designated position. When the current block is a chroma block, the position of the neighboring block is varied.

When the current block is in a square shape, the MFM is derived at the position shown in (a) or (b) of FIG. 14 or at a predetermined designated position. When the current block is in a rectangular shape, the position of the neighboring block is varied.

In predicting the mode on a per-subblock basis, the prediction mode may be derived by searching all of the neighboring blocks or by searching a part of the neighboring blocks.

In predicting the mode on a per-subblock basis, the intra prediction mode may be derived from a spatially neighboring block. The spatially neighboring block of the current block may be a block that has already been encoded/decoded.

Figure 11:
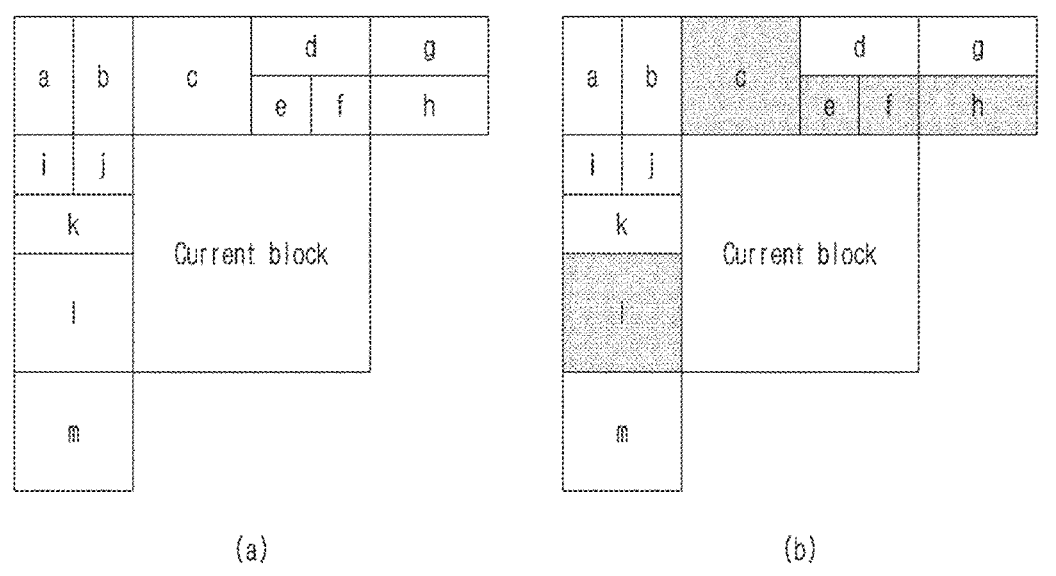

FIG. 11 is a diagram illustrating a spatially neighboring block of a current block.

In FIG. 11, the block a to the block m are the neighboring blocks of the current block. The shaded blocks are inter predicted blocks, and the remaining blocks are intra predicted blocks.

As shown in (a) of FIG. 11, when all the neighboring blocks are intra predicted, the MFM of the current block is derived by searching all the neighboring blocks on a per-subblock basis.

As shown in (b) of FIG. 11, when some of the neighboring blocks are intra predicted, the MFM of the current block is derived by searching only the intra predicted neighboring blocks on a per-subblock basis.

In the example shown in (b) of FIG. 11, when some of the neighboring blocks are inter predicted, the intra prediction mode is found from the reference picture for the corresponding neighboring blocks and is substituted for the intra prediction mode for deriving the prediction mode of the current block. From the prediction modes found on a per-subblock basis including the substituted intra prediction mode, the MFM of the current block may be derived.

In predicting the mode on a per-subblock basis, the intra prediction mode may be derived from a temporally neighboring block.

The temporally neighboring block of the current block may be a reference block that is present within a reference picture which has already been encoded/decoded. The reference picture may be at least one picture stored in a reference picture buffer (also referred as a decoded picture buffer, DPB).

Figure 12:
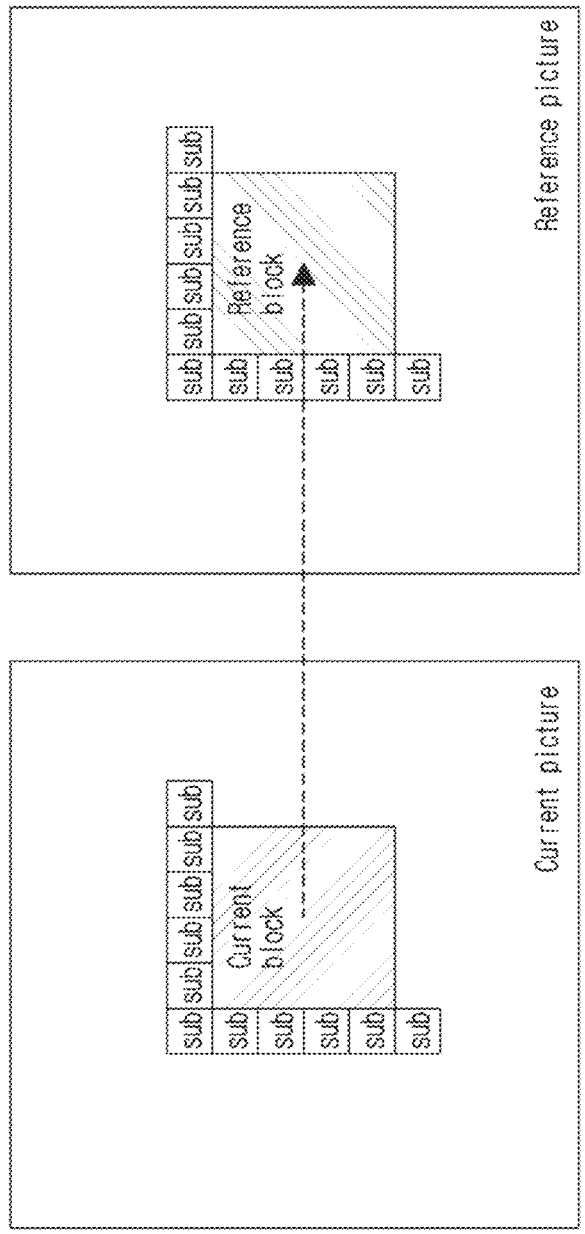
FIG. 12 is a diagram illustrating a temporally neighboring block of a current block.

FIG. 12 is a diagram illustrating a temporally neighboring block of a current block.

In deriving the intra prediction mode of the current block, the spatially neighboring blocks of the reference block are searched on a per-subblock basis to derive the MFM of the current block.

For example, when all the spatially neighboring blocks of the reference block are intra predicted as shown in FIG. 11, all the neighboring blocks are searched on a per-subblock basis to derive the MFM of the current block.

For example, when some of the spatially neighboring blocks of the reference block are intra predicted as shown in (b) of FIG. 11, only the intra predicted neighboring blocks are searched on a per-subblock basis to derive the MFM of the current block.

For example, when some of the spatially neighboring blocks of the reference block are inter predicted as shown in (b) of FIG. 11, the intra prediction mode is found from the reference picture for the corresponding neighboring blocks and is substituted for the intra prediction mode for deriving the prediction mode of the current block. From the prediction modes found on a per-subblock basis including the substituted intra prediction mode, the MFM of the current block may be derived.

In deriving the intra prediction mode on a per-subblock basis, the intra prediction mode may be derived through spatial and/or temporal template matching.

When the intra prediction mode is derived through the template matching, an indicator indicating whether or not the template matching is performed is encoded/decoded.

When a template matching indicator has a first value (for example, "1"), the MFM of the current block is derived from the block that is found by performing template matching.

When the template matching indicator has a second value (for example, "0"), the MFM of the current block is derived from the prediction modes found on a per-subblock basis, the subblocks being around the current block.

At least one matching method among spatial and temporal template matching methods may be used.

When both spatial template matching and temporal template matching are possible, an index indicating which template matching is used is encoded/decoded.

When a template matching index has a first value (for example, "0"), the spatial template matching (or the temporal template matching) is performed.

When the template matching index has a second value (for example, "1"), the temporal template matching (or the spatial template matching) is performed.

When the spatial template matching is performed, the spatial template is constructed from the neighboring blocks of the current block. For example, the spatial template may be constructed with various sizes and depths as with the construction of the subblocks shown in FIG. 9.

Using the constructed template, the most similar template may be found within the search range from the already encoded/decoded blocks.

The search range may be specified to be a picture, a slice, a CTU, a neighboring region, or the like. For example, the search range may be specified to be a range of a current picture, a current slice, a predetermined CTU around a current CTU. The specified search range may be searched for the template most similar to the constructed spatial template.

Herein, a CTU index (CTU index) related to the search range may be encoded/decoded. For example, when CTU index is 0, the search range is CTU 0.

For example, the searching may be performed within the neighboring region of the current block. When there is at least one neighboring region, at least one index (Region_index) for specifying the at least one neighboring region is encoded/decoded. For example, when Region_index is 0, the search range is Region 0.

Searching for the most similar template may correspond to searching for the template having the smallest difference from the template of the current block, and a sum of absolute difference (SAD) method, or the like may be used.

The MFM of the current block may be derived on a per-subblock basis from the block that is found by performing template matching. The derivation process may be the same as that of the above-described method of deriving the MFM from the spatially/temporally neighboring blocks.

When performing the temporal template matching, the temporal template of the current block is present within the reference picture that has already been encoded/decoded. The reference picture may be at least one picture stored in the reference picture buffer (also referred as the decoded picture buffer, DPB).

The temporal template may be constructed from the temporally neighboring blocks of the current block. For example, the temporal template may be constructed with various sizes and depths as with the construction of the subblocks shown in FIG. 9. The temporal template may be the neighboring blocks of the reference block that is present within the reference picture.

Using the constructed template, the most similar template may be found from the vicinity of the position within the reference picture, which corresponds to the position of the current block.

The searching for the most similar template may correspond to searching for the template having the smallest difference from the template of the current block, and the sum of absolute difference (SAD) method, or the like may be used.

The MFM of the current block may be derived on a per-subblock basis from the block that is found by performing template matching. The derivation process may be the same as that of the above-described method of deriving the MFM from the spatially/temporally neighboring blocks.

In order to encode/decode the intra prediction mode of the current block, N predetermined modes among the intra prediction modes may be derived to be MFMs. The MFMs may include various modes, such as DC, Planar, PDPC, LM, angular modes, and the like.

The N predetermined modes may be selected depending on the characteristics of the modes.

For example, N non-angular modes may be selected as the MFMs. For example, when the intra prediction modes include modes (DC, Planar, and 33 angular modes), the DC mode and the Planar mode are selected as the MFMs. Alternatively, when the intra prediction modes include 67 modes (DC, Planar, and 65 angular modes), the DC mode and the Planar mode are selected as the MFMs. Herein, an index indicating one mode among N modes may be encoded/decoded.

For example, the intra prediction mode commonly selected may be selected as the MFM.

When the intra prediction modes include 35 modes or 67 modes including two non-angular modes as described above, the DC mode and the Planar mode (N=2), which are commonly selected, are selected as the MFMs. Alternatively, the DC mode or the Planar mode (N=1), which are commonly selected, may be selected as the MFM. Alternatively, when one mode among the angular modes is commonly selected, the corresponding angular mode is selected as the MFM.

Herein, when N is 2 or more, an index indicating one of N modes is encoded/decoded.

The mode that is commonly selected may be pre-defined in the encoder/decoder. The mode that is commonly selected may be used for an update of every predetermined unit. The predetermined unit may be at least one among a video, a sequence, a picture, a slice, a tile, and a CTU. For the update, information on the frequency of use of each mode may be stored. Each time the predetermined unit is changed, one or more modes commonly selected may be selected on the basis of the stored information on the frequency of use. Alternatively, information on one or more modes commonly selected may be signaled on a per-predetermined unit basis.

The mode derived as the MFM may be excluded from construction of the MPM candidate list. For example, when the DC mode and/or the Planar mode is selected as the MFM, the DC mode and/or the Planar mode is excluded in constructing the MPM candidate list.

Whether or not the derived MFM is the same as the intra prediction mode of the current block may be determined. For example, when the MFM is the Planar mode and the intra prediction mode of the current block is the Planar mode, the intra prediction mode of the current block is encoded/decoded using the MFM. When the intra prediction mode of the current block differs from the MFM, the MPM list is constructed. When the MPM list includes the intra prediction mode of the current block, the intra prediction mode of the current block is encoded/decoded using the MPM index.

The indicator indicating whether or not the intra prediction mode of the current block is the MFM may be encoded/decoded. When the intra prediction mode of the current block is the same as the MFM, the MFM indicator has a first value (for example, "1"). Otherwise, the MFM indicator has a second value (for example, "0").

When the MFMs include at least two modes or N modes, further MFM indexes each indicating one of N modes are encoded/decoded.

Figure 27:
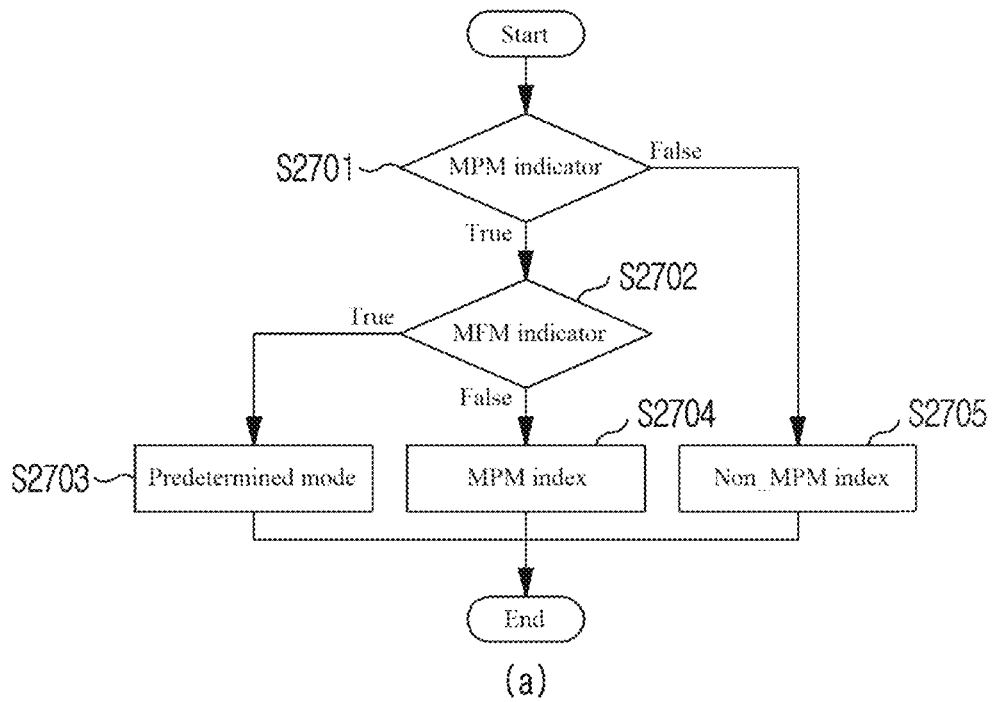
FIG. 27 is a diagram illustrating an example in which an MFM and an MPM are used in determining an intra prediction mode.
Figure 27:
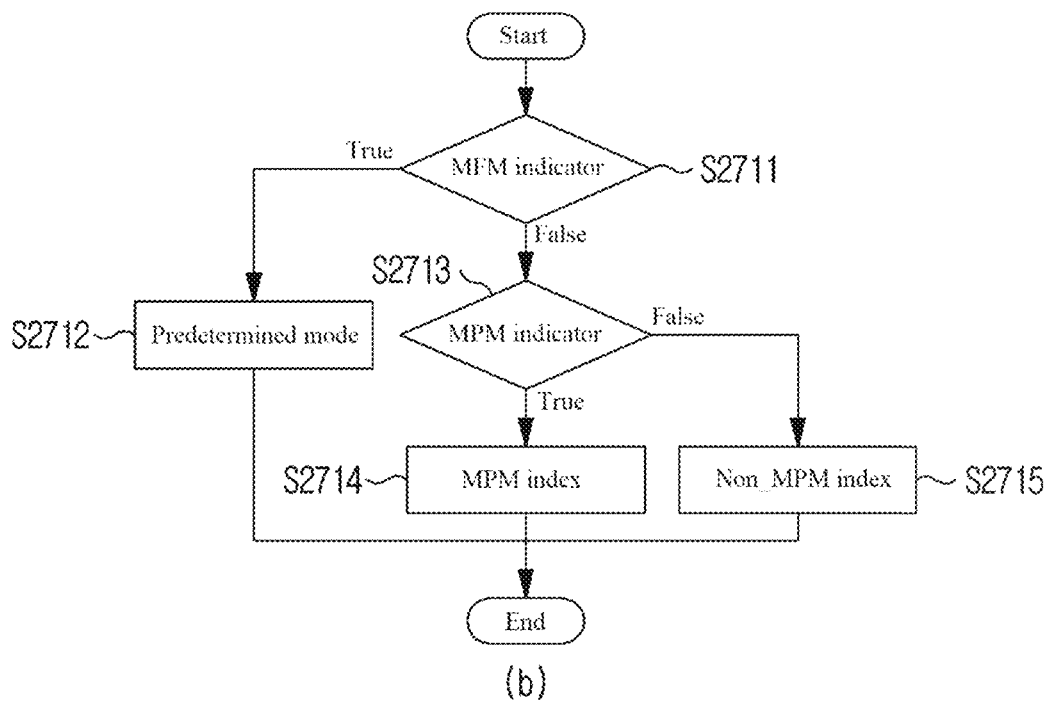

FIG. 27 is a diagram illustrating an example in which an MFM and an MPM are used in determining an intra prediction mode.

As shown in (a) of FIG. 27, determination regarding the MPM indicator may be performed, and then determination regarding the MFM indicator may be performed.

In (a) of FIG. 27, whether the MPM indicator indicates true or false may be determined at step S2701. When the MPM indicator indicates true (for example, "1"), whether the MFM indicator indicates true or false is determined at step S2702.

When the MFM indicator indicates true (for example, "1"), a predetermined mode is derived as the intra prediction mode of the current block at step S2703. The predetermined mode may be, for example, the Planar mode or the DC mode. Alternatively, there may be multiple predetermined modes (for example, two non-angular modes). In this case, the mode indicated by the MFM index may be derived as the intra prediction mode of the current block.

When the MFM indicator indicates false (for example, "0"), the mode indicated by the MPM index among the MPM candidates except for the MFM is derived as the intra prediction mode of the current block at step S2704.

When the MPM indicator indicates false (for example, "0"), the mode indicated by a Non_MPM index among the modes except for the MPM candidates is derived as the intra prediction mode of the current block at step S2705.

As shown in (b) of FIG. 27, determination regarding the MFM indicator may be performed, and then determination regarding the MPM indicator may be performed.

In (b) of FIG. 27, whether the MFM indicator indicates true or false may be determined at step S2711. When the MFM indicator indicates true (for example, "1"), a predetermined mode is derived as the intra prediction mode of the current block at step S2712. The predetermined mode may be, for example, the Planar mode or the DC mode. Alternatively, there may be multiple predetermined modes (for example, two non-angular modes). In this case, the mode indicated by the MFM index may be derived as the intra prediction mode of the current block.

When the MFM indicator indicates false (for example, "0"), whether the MPM indicator indicates true or false is determined at step S2713. When the MPM indicator indicates true (for example, "1"), the mode indicated by the MPM index among the MPM candidates except for the MFM is derived as the intra prediction mode of the current block at step S2714.

When the MPM indicator indicates false (for example, "0"), the mode indicated by the Non_MPM index among the modes except for the MPM candidates is derived as the intra prediction mode of the current block at step S2715.

At least one among the MFM indicator and the MPM indicator may be inferred or implied by an indicator regarding various intra prediction methods.

Herein, the various intra prediction methods include at least one among multi reference line (MRL), intra sub partition (ISP), and matrix intra prediction (MIP) methods.

For example, assuming that the various intra prediction methods are performed only on one or more candidates among the MPM candidates and the MFM candidates, when an indicator indicating the various intra prediction methods is 1, it is inferred/implied that at least one among the MPM indicator and the MFM indicator indicates true (for example, "1"). Herein, determination regarding the MFM indicator is performed before or after determination regarding the MPM indicator is performed, as described above with reference to FIG. 27.

For example, it is assumed that the ISP method among the various intra prediction methods is performed on the MPM candidates and on the MFM candidates.

Figure 28:
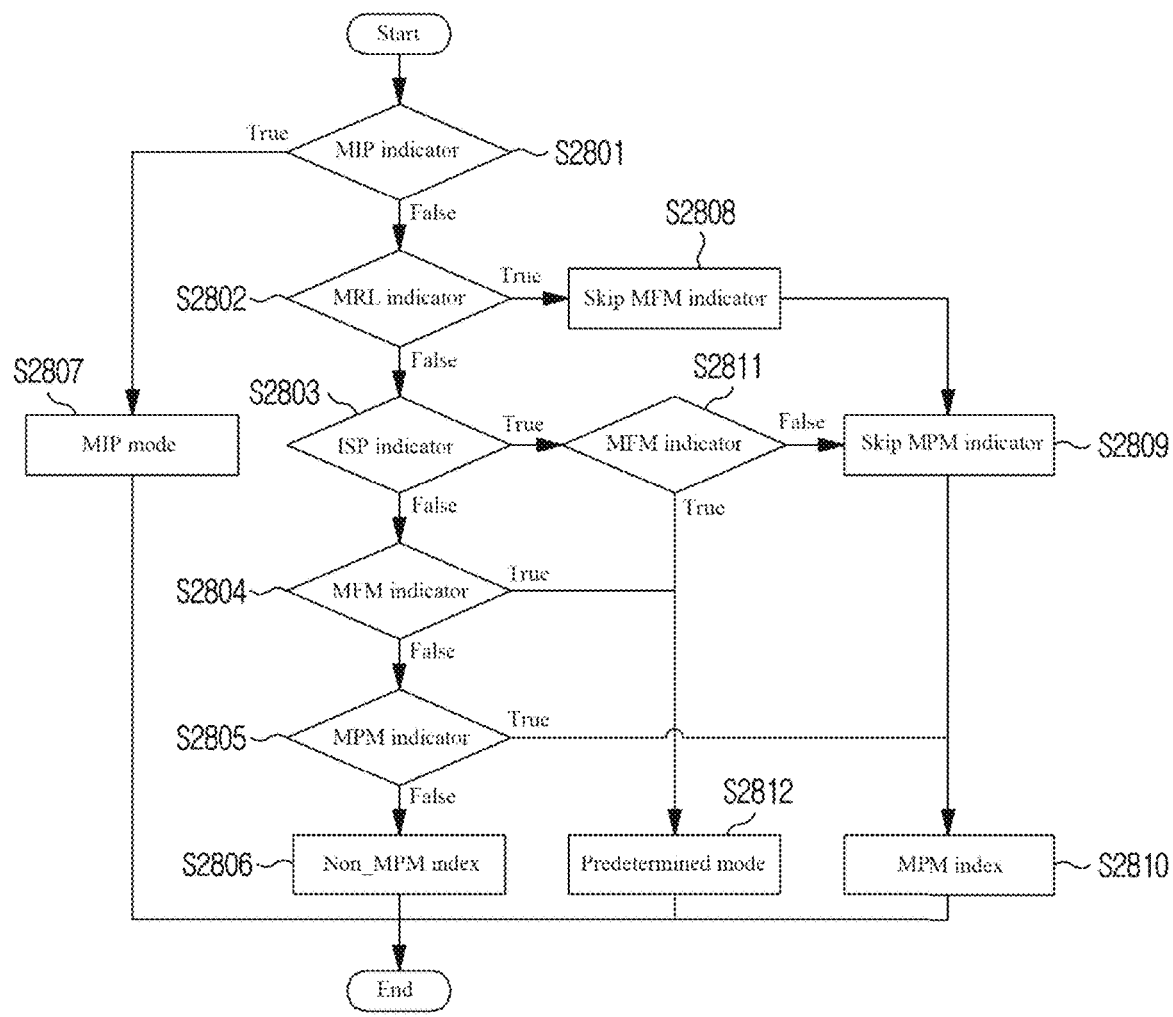
FIG. 28 is a diagram illustrating an example of an intra prediction mode determination method in the case where the ISP method is performed on the MPM candidates and the MFM candidates.

FIG. 28 is a diagram illustrating an example of an intra prediction mode determination method in the case where the ISP method is performed on the MPM candidates and the MFM candidates.

In the example shown in FIG. 28, determination regarding the MFM indicator precedes determination regarding the MPM indicator.

First, whether an MIP indicator indicates true (for example, "1") or false (for example, "0") may be determined at step S2801. When the MIP indicator indicates true, an MIP mode is performed at step S2807. When the MIP indicator indicates false, whether an MRL indicator indicates true (for example, "1") or false (for example, "0") is determined at step S2802. When the MRL indicator indicates true, determination regarding the MFM indicator and the MPM indicator is omitted at steps S2808 and S2809. In this case, signaling of the MFM indicator and the MPM indicator may be omitted; the MFM indicator and the MPM indicator may be inferred to indicate "false" and "true", respectively; and the intra prediction mode of the current block may be derived on the basis of the signaled MPM index at step S2810.

When the MRL indicator indicates false, whether the ISP indicator indicates true (for example, "1") or false (for example, "0") is determined at step S2803. When the ISP indicator indicates true, whether the MFM indicator indicates true (for example, "1") or false (for example, "0") is determined at step S2811.

At step S2811, when the MFM indicator indicates false, determination regarding the MPM indicator is omitted at step S2809. In this case, signaling of the MPM indicator may be omitted, the MPM indicator may be inferred to indicate "true", and the intra prediction mode of the current block may be derived on the basis of the signaled MPM index at step S2810.

At step S2811, when the MFM indicator indicates true, a predetermined mode is determined as the intra prediction mode of the current block at step S2812. When there are two or more predetermined modes, one mode of the two or more predetermined modes is determined, on the basis of the MFM index, to be the intra prediction mode of the current block.

When the ISP indicator indicates false, whether the MFM indicator indicates true (for example, "1") or false (for example, "0") is determined at step S2804.

At step S2804, when the MFM indicator indicates true, a predetermined mode is determined as the intra prediction mode of the current block at step S2812.

At step S2804, when the MFM indicator indicates false, whether the MPM indicator indicates true (for example, "1") or false (for example, "0") is determined at step S2805. When the MPM indicator indicates true, the intra prediction mode of the current block is derived on the basis of the signaled MPM index at step S2810. When the MPM index indicates false, the intra prediction mode of the current block is determined on the basis of Non_MPM index that is information indicating one among the mode except for the MFM candidates and the MPM candidates.

Figure 29:
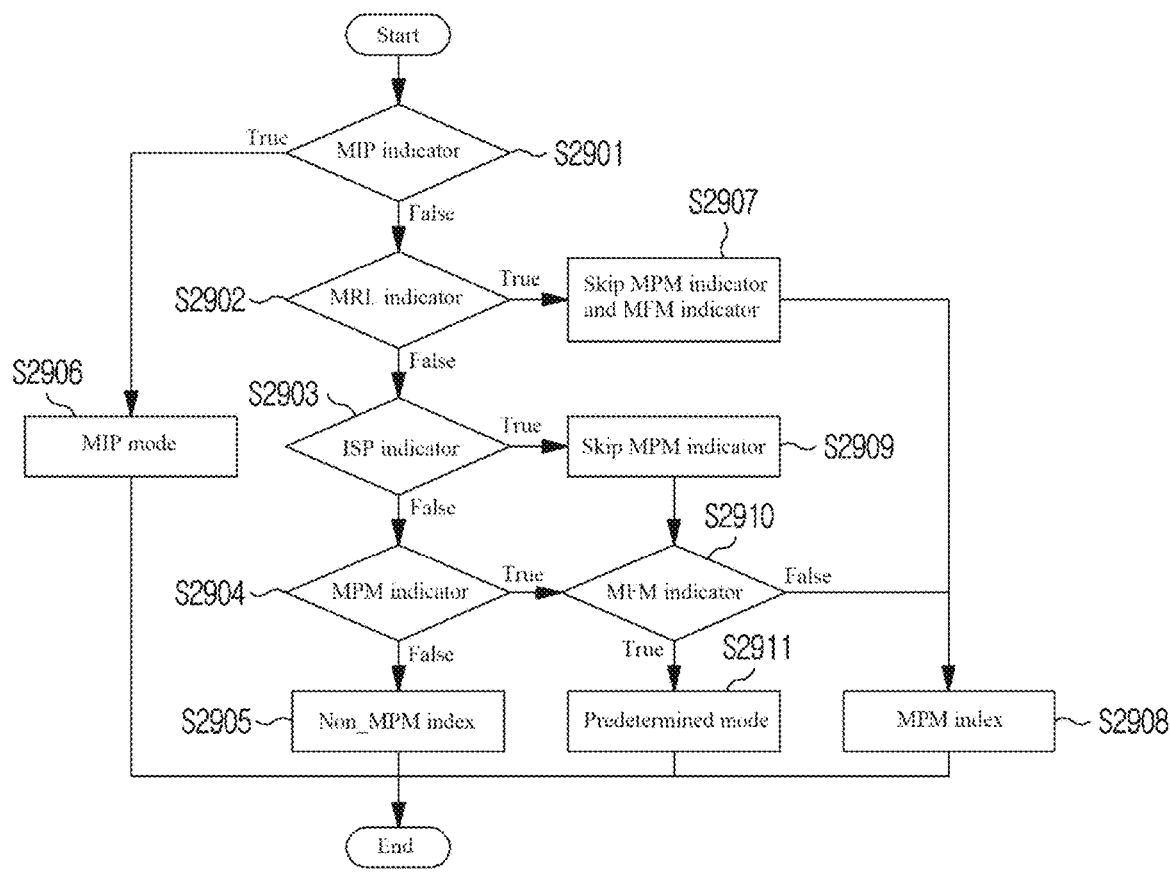
FIG. 29 is a diagram illustrating another example of an intra prediction mode determination method in the case where the ISP method is performed on the MPM candidates and the MFM candidates.

FIG. 29 is a diagram illustrating another example of an intra prediction mode determination method in the case where the ISP method is performed on the MPM candidates and the MFM candidates.

In the example shown in FIG. 29, determination regarding the MPM indicator precedes determination regarding the MFM indicator.

Steps S2901, S2902, and S2906 may correspond to steps S2801, S2802, and S2807, respectively. Further, similarly to the example shown in FIG. 28, when the MRL indicator indicates true, determination regarding the MFM indicator and the MPM indicator is omitted at step S2907 and the intra prediction mode of the current block is determined depending on the MPM index at step S2908.

At step S2903, when the ISP indicator indicates true, determination regarding the MPM indicator is omitted at step S2909. For example, the MPM indicator may not be signaled and may be inferred to indicate "true", and whether the MFM indicator indicates true (for example, "1") or false (for example, "0") may be determined at step S2910.

When the MFM indicator indicates true, step S2911 is performed. When the MFM indicator indicates false, step S2908 is performed.

When the ISP indicator indicates false, whether the MPM indicator indicates true (for example, "1") or false (for example, "0") is determined at step S2904. When the MPM indicator indicates true, proceeding to step S2910 takes place and the subsequent steps are as described above. When the MPM indicator indicates false, proceeding to step S2905 takes place.

Steps S2905, S2908, and S2911 may correspond to step S2806, S2810, and S2812, respectively.

For example, when at least one method among the various intra prediction methods is performed only on the MPM candidates and is not performed on the MFM candidates, it is inferred or implied that the MPM indicator indicates "true" and the MFM indicator indicates "false".

For example, when the MRL method is performed on the MPM candidates but is not performed on the MFM candidates, the MFM indicator is not signaled and is inferred to indicate "false". Further, the MPM indicator may not be signaled and may be inferred to indicate "true". In this case, among the MPM candidates except for the predetermined mode (MFM candidate), the mode indicated by the MPM index may be determined as the intra prediction mode of the current block.

In order to derive the intra prediction mode of the current block by using the MPM, an MPM list including M intra prediction modes as the MPM candidates may be constructed. The MPM candidate may be derived from the intra prediction mode of the already encoded/decoded neighbor block. The maximum number of the MPM candidates included in the MPM list may be determined on the basis of at least one among the slice type, the color component, the size, and the shape of the current block.

The neighbor blocks for deriving the MPM candidates are varies. For example, at least one among the subblock positions shown in (a) of FIG. 9 may be used as the neighbor block. When there are multiple neighbor blocks for deriving the MPM candidates, the sequences of the neighbor blocks vary according to at least one among the slice type, the color component, the size, and the shape of the current block.

Figure 25:
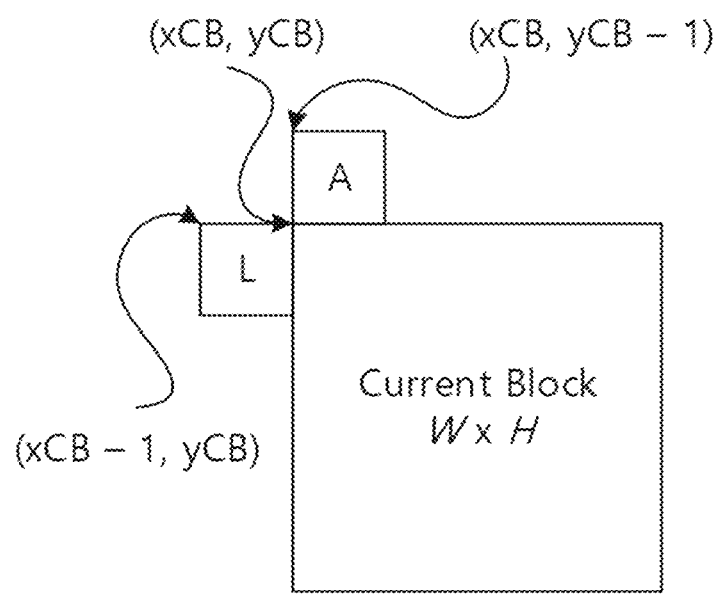
FIG. 25 is a diagram illustrating an example of the positions of the neighbor blocks for deriving the MPM candidates.

FIG. 25 is a diagram illustrating an example of the positions of the neighbor blocks for deriving the MPM candidates.

Figure 26:
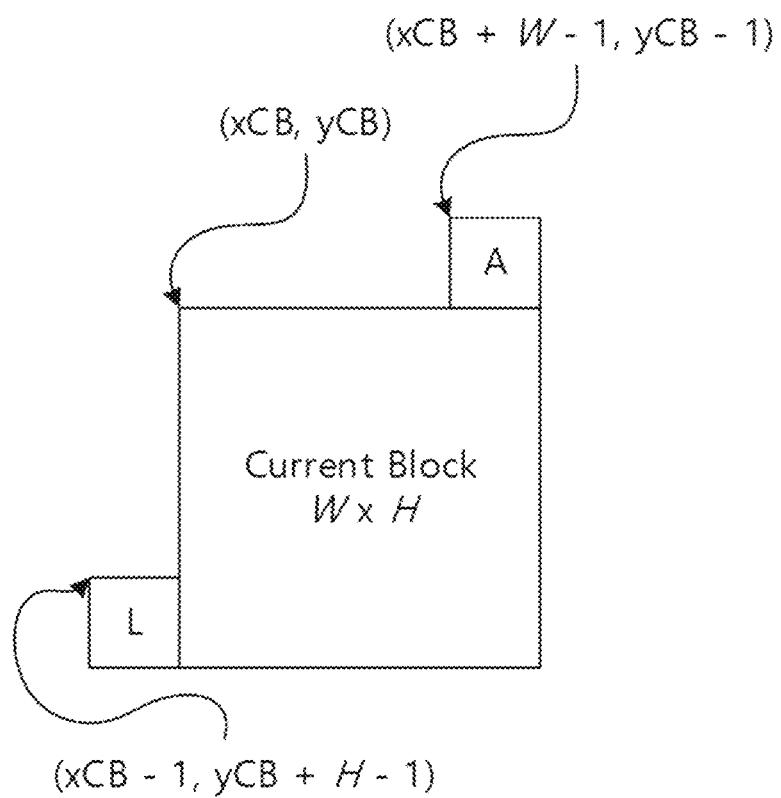
FIG. 26 is a diagram illustrating another example of the positions of the neighbor blocks for deriving the MPM candidates.

FIG. 26 is a diagram illustrating another example of the positions of the neighbor blocks for deriving the MPM candidates.

As shown in FIG. 25, when the top left coordinates of the current block are (xCB, yCB), the top neighbor block A for deriving the MPM candidate is the leftmost block including the coordinates of (xCB, yCB−1). Further, the left neighbor block L for deriving the MPM candidate may be the topmost block including the coordinates of (xCB−1, yCB).

Alternatively, as shown in FIG. 26, when the top left coordinates of the current block are (xCB, yCB), the top neighbor block A for deriving the MPM candidate is the block including the coordinates of (xCB+W−1, yCB−1). Further, the left neighbor block L for deriving the MPM candidate may be the block including the coordinates of (xCB−1, yCB+H−1).

In FIGS. 25 and 26, the size of the current block is W×H, and W and H may be the same or different from each other.

When the left neighbor block and/or the top neighbor block is unavailable, an intra prediction mode for an unavailable neighbor block is set to be a non-angular mode. For example, the Planar mode may be set as the intra prediction mode of the unavailable neighbor block.

For example, when the maximum number of the MPM candidates is three, the neighbor blocks at positions L, A, and AL shown in (a) of FIG. 14 are used. The derivation sequence of the neighbor blocks may be L, A, and AL, in that order, but is not limited thereto.

For example, when the current block is in a rectangular shape horizontally long, the derivation sequence is A, L, and AL. Alternatively, the MPM list may be constructed according to the sequence, L, A, and AL.

Alternatively, a list of three MPMs may be constructed using the intra prediction modes of the neighbor blocks at position A and position L shown in (a) of FIG. 14. For example, when the intra prediction mode at position A and the intra prediction mode at position L are the same and are the non-angular (DC or Planar) modes, the MPM list of {Planar, DC, vertical} is constructed. When the intra prediction mode at position A and the intra prediction mode at position L are the same and are the angular modes, the MPM list of {L, 2+((L+61) % 64), 2+((L−1) % 64)} is constructed.

For example, when the maximum number of the MPM candidates is six, a list of six MPMs is constructed using the intra prediction modes of the neighbor blocks at position A and position L shown in (a) of FIG. 14. For example, when the intra prediction mode at position A and the intra prediction mode at position L are the same and are the non-angular (DC or Planar) modes, the MPM list of {Planar, DC, vertical, horizontal, Ver−4, Ver+4} is constructed. When the intra prediction modes at positions A and L are the same and are the angular modes, the MPM list of {L, Planar, DC, L−1, L+1, L−2} is constructed.

For example, when the intra prediction mode at position A and the intra prediction mode at position L are different from each other and the two modes are the angular modes, the MPM list including positions L and A is constructed.

In the above-described examples, a predetermined integer is added to or subtracted from the MPM candidate already included in the MPM list such that another MPM candidate is derived. Herein, the predetermined integer may be 1, 2, 4, or any integer.

For example, when the maximum number of the MPM candidates is six, the neighbor blocks at positions L, A, LB, AR, and AL shown in (b) of FIG. 14 are used. The derivation sequence of the neighbor blocks may be L, A, LB, AR, and AL, in that order, but is not limited thereto. For example, when the current block is in a rectangular shape horizontally long, the derivation sequence is A, L, LB, AR, and AL.

When using the most frequent mode (MFM), N modes or N lists are constructed regardless of the construction of the MPM list. For example, even though a particular mode is derived as the MFM, the MPM list including the derived MFM is constructed. For example, when the MFM is the Planar mode, examples of the MPM include the Planar mode.

Alternatively, when using the MFM, the MPM list excluding the MFM is constructed. For example, when the MFMs are DC and Planar modes, the MPM list of the modes excluding DC and Planar modes is constructed. For example, when the MFM is mode 18, the MPM list excluding mode 18 is constructed.

When there is one MFM, the MPM list including only five MPM candidates is constructed. For example, the MPM list is constructed only when the MFM indicator has a second value (for example, "0" or "false").

Hereinafter, in the case where the intra prediction mode of the top adjacent block is A; the intra prediction mode of the left adjacent block is L; and the MFM is the Planar mode, a method of constructing an MPM list including five MPM candidates will be described.

When both intra prediction mode A and intra prediction mode L are non-angular modes, namely, DC or Planar modes, only the DC mode is included in the MPM list. The remaining four MPM candidates may be predetermined angular modes. The predetermined angular modes may include, for example, a vertical mode and a horizontal mode. A mode obtained by adding or subtracting a predetermined offset from the vertical mode and the horizontal mode may be included in the MPM list. The predetermined offsets may be, for example, −4 and +4. Therefore, in addition to the vertical mode and the horizontal mode, modes such as "vertical mode−4", "vertical mode+4", and the like may be included in the MPM list. However, the offsets are not limited to the above examples, and may be predetermined integers.

When intra prediction mode A and intra prediction mode L are the same angular mode, the MPM list includes the angular mode and a mode obtained by adding or subtracting a predetermined offset from the angular mode. Further, the DC mode may be included in the MPM list as a default mode. For example, the MPM list may be composed of {L, L−1, L+1, DC, L−2}.

When intra prediction mode A and intra prediction mode L are different angular modes, intra prediction modes A and L are included in the MPM list. Further, the DC mode may be included in the MPM list as a default mode. The remaining MPM candidates may be determined on the basis of the different between intra prediction modes A and L. That is, it is determined whether or not a result value obtained by subtracting the smaller value from the larger value, which are selected from the values of intra prediction modes A and L, is within a predetermined range, and depending on the result of the determination, different methods are used to determine the remaining MPM candidates.

When one of intra prediction modes A and L is a non-angular mode and the other one is an angular mode, the MPM list includes the angular mode and a mode obtained by adding or subtracting a predetermined offset from the angular mode. Further, the DC mode may be included in the MPM list as a default mode.

The MPM list may be constructed similarly to the above-described method of deriving N MFMs from the neighboring subblocks (hereinafter, referred to as "method [1]").

For example, N MPM candidates are derived on the basis of the frequency of occurrence of the prediction modes of the already encoded/decoded neighboring subblocks such that the MPM list is constructed.

In the example shown in (a) of FIG. 10, when N is 2, mode 18 and mode 15 are included in the MPM list on the basis of the frequency of occurrence.

For example, when prediction modes of two or more subblocks are the same in the frequency of occurrence, the priority is determined depending on the size of the block including the corresponding subblocks. The block including the subblocks may be at least one among a CTU, a CU, a PU, and a TU.

The MPM list may be constructed similarly to the above-described method of deriving MFMs by selecting N modes among intra prediction modes (hereinafter, referred to as "method [2]").

For example, the MPM list may be constructed by selecting, as MPM candidates, N modes that frequently occur among intra prediction modes.

The MPM list may include the prediction modes of the temporally and/or spatially neighboring blocks, as MPM candidates (hereinafter, referred to as "method [3]").

For example, when the maximum number of MPM candidates is six, the intra prediction mode of at least one subblock of the adjacent subblocks around the current block shown in FIG. 9 is determined as the MPM candidate. Alternatively, intra prediction modes of one or more spatially neighboring blocks may be combined to construct the MPM list.

For example, when the maximum number of the MPM candidates is six, intra prediction modes corresponding to M reference blocks are used. The M reference blocks may be determined on the basis of the order of reference blocks that are present in the reference picture close to the current picture considering the POC. Alternatively, intra prediction modes of one or more temporally neighboring blocks may be combined to construct the MPM list.

For example, when the maximum number of the MPM candidates is six, the intra prediction modes of the spatially neighboring blocks of the current block and the intra prediction mode of the reference block are used.

When the intra prediction modes of the spatially neighboring block are not present, the intra prediction modes of the reference blocks at the same positions as the corresponding spatially neighboring blocks are used as substitute modes. Alternatively, the intra prediction modes of the reference blocks corresponding to motion information of the spatially neighboring blocks may be used as substitute modes.

Alternatively, the intra prediction modes of one or more spatially/temporally neighboring blocks may be combined to construct the MPM list.

When at least one method of the methods [1], [2], and [3] is unable to fill the MPM list up, the MPM list is filled using a combination of the methods or a similar mode.

The sequence of using the methods [1], [2], and [3] may be [1]-[2]-[3] or [2]-[1]-[3], but is not limited thereto. For example, when the method [1] is unable to fill the MPM list up, the method [2] or the method [3] is used. Alternatively, when the angular MPM candidate mode already included in the MPM list is K, the MPM list is constructed adding modes such as K+a, K−a (a is an integer of one or more), and the like.

The sequences of deriving the MPM candidates may vary according to the shape of the current block.

For example, in the case where the current block is in a W×H size with W>H, when applying the method [1], [2], or [3], the top neighboring block is preferentially considered to derive the prediction mode of the spatially neighboring block and/or the temporally neighboring block.

In the case where the current block is in a W×H size with W>H, when applying the method [1], [2], or [3], the left neighboring block is preferentially considered to derive the prediction mode of the spatially neighboring block and/or the temporally neighboring block.

Figure 13:
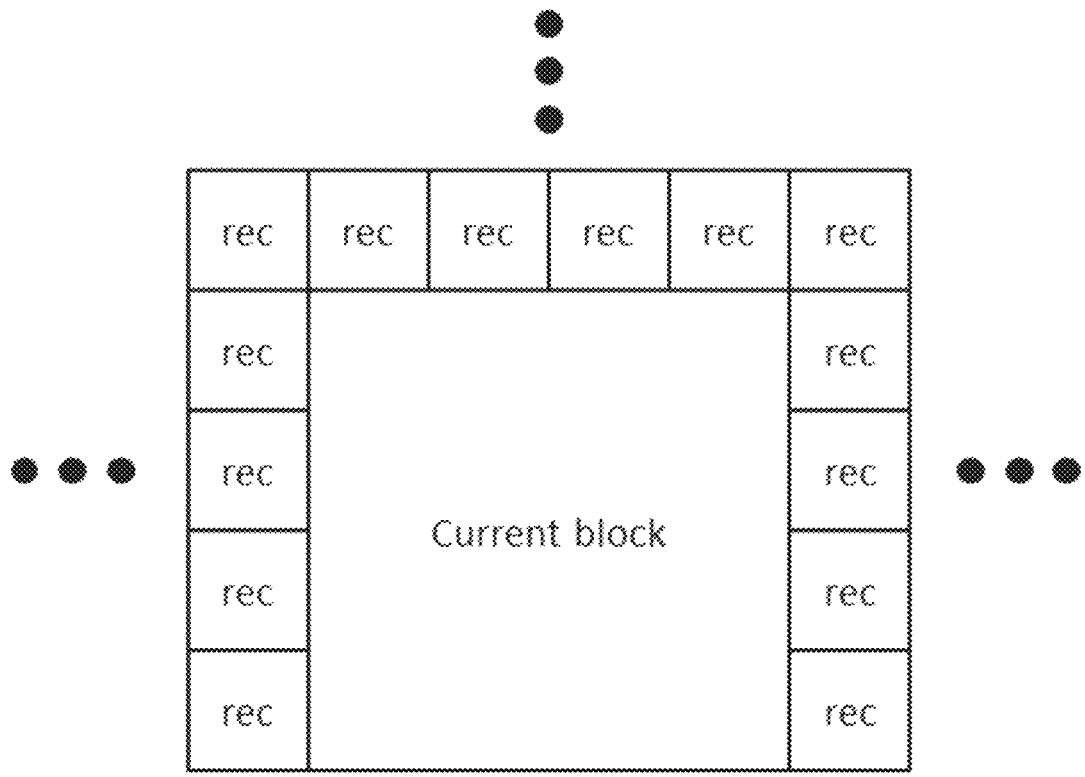
FIG. 13 is a diagram illustrating available neighboring blocks for constructing the MPM list.

FIG. 13 is a diagram illustrating available neighboring blocks for constructing the MPM list.

As shown in FIG. 13, at least one already encoded/decoded neighboring block may be present on the top, the left side, and the right of the current block. The MPM list may be constructed differently depending on the position at which the already encoded/decoded neighboring block is present.

For example, when the already encoded/decoded blocks are preset at the right side and the top, the MPM list is constructed by deriving the MPM candidate from at least one spatially and/or temporally neighboring block at the right side and the top.

For example, when the already encoded/decoded blocks are present at all the right side, the top, and the left side, the MPM list is constructed by deriving the MPM candidate from at least one spatially and/or temporally neighboring block at the right side, the top, and the left side.

One or more MPM lists may be constructed. For example, three MPM lists, such as MPM list 1, MPM list 2, and MPM list 3, may be constructed. Herein, the intra prediction modes included in the respective MPM lists may not overlap with each other.

The maximum numbers of the MPM candidates that the MPM list includes may vary according to the slice type. For example, in the case of slice I, the maximum number of the MPM candidates may be six. In the case of slice P or B, the maximum number of the MPM candidates may be three.

The maximum numbers of the MPM candidates may vary according to the color component. For example, in the case of the luma component, the maximum number of the MPM candidates may be six. In the case of the chroma component, the maximum number of the MPM candidates may be three.

The intra prediction mode may be represented by a mode number. The directions depending on the mode number may vary according to the size and/or the shape of the current block. Therefore, even though the mode of the neighboring block is the same as the mode of the current block, the respective directions may differ. The MPM list for the current block may be composed of the modes of the neighboring blocks or a mode most similar to the modes of the neighboring blocks.

According to the size and/or the shape of the current block, the directions of available intra prediction may vary. For example, the ranges of the prediction directions, the angles of the prediction directions, or the like may vary. That is, the prediction angle may expand to a predetermined direction, and the mode for the expanded prediction angle to the direction may be substituted for the mode for an unused prediction angle.

The angle of the expanded angular prediction may be determined depending on the shape of the current block and/or a ratio (the aspect ratio) between the horizontal length and the vertical length of the current block. For example, when the current block is in a rectangular shape horizontally long, angular prediction at a 135 degree angle or more is possible. Further, the mode number of the mode for the expanded angle may be replaced by the mode number of the existing mode between a −45 degree angle and a 0 degree angle.

For example, when the current block is in a rectangular shape vertically long, angular prediction at angle of −45 degrees or less is possible. Further, the mode number of the mode for the expanded angle may be replaced by the mode number of the existing mode between a 90 degree angle and a 135 degree angle.

Figure 21:
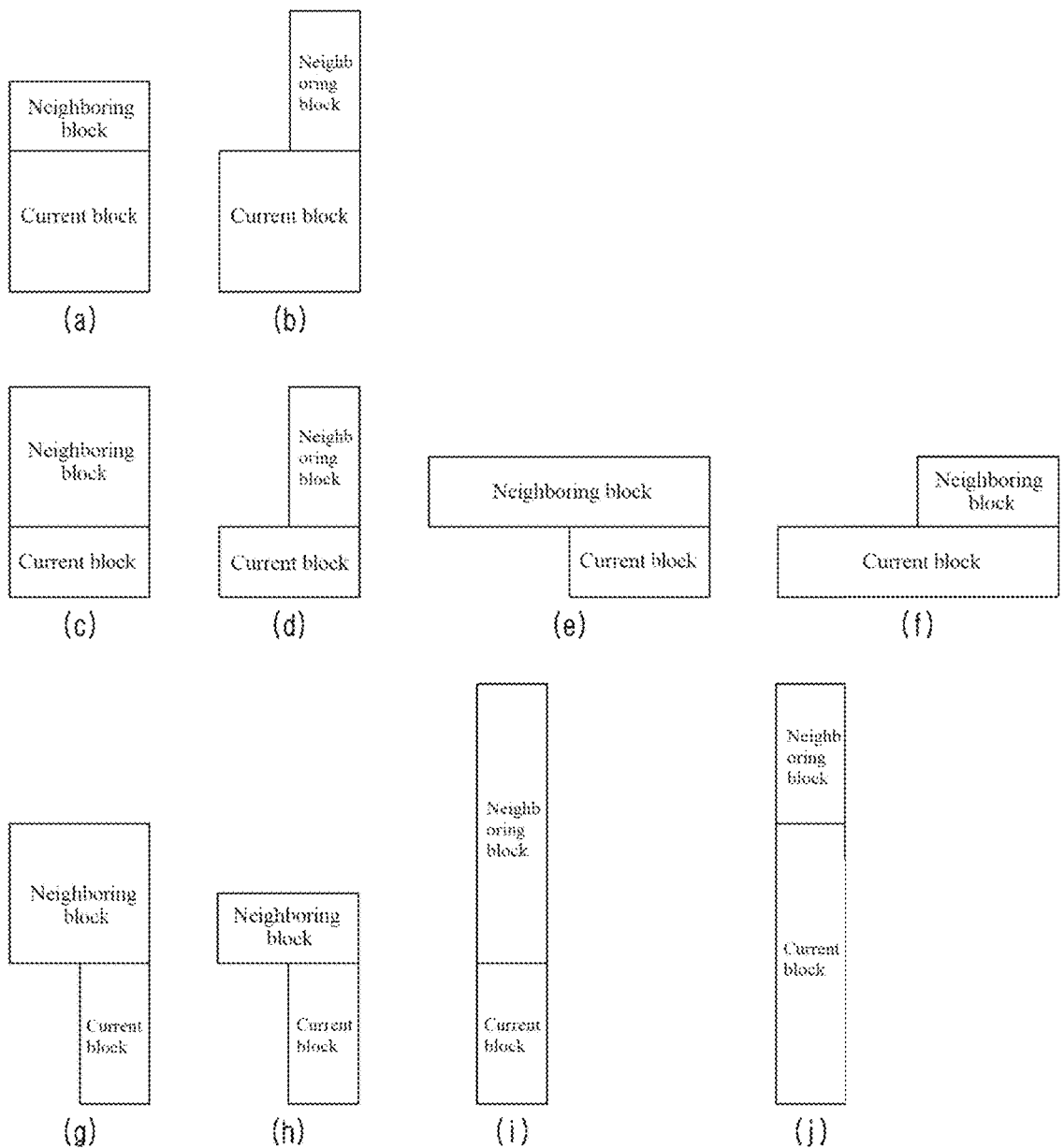
FIG. 21 is a diagram illustrating an example in which directions vary according to the mode number of the current block and the mode number of the neighboring block.

FIG. 21 is a diagram illustrating an example in which directions vary according to the mode number of the current block and the mode number of the neighboring block.

As described above, the directions based on the mode number may vary according to the size and/or the shape of the block. Therefore, when the current block and the neighboring block differ in the size and/or the shape, the angular mode of the neighboring block is not included in the angular modes available for the current block.

For example, as shown in (a) of FIG. 21, when the current block is in a square shape and the neighboring block is in a rectangular shape horizontally long, the mode for the expanded angle, among the angular modes of the neighboring blocks, is unavailable for the current block.

Similarly, as shown in (b) to (j) FIG. 21, when the current block and the neighboring block differ in the size and/or the shape, the angular mode of the neighboring block is the angular mode unavailable for the current block.

When the angular mode of the neighboring block is unavailable for the current block, the prediction mode similar to the intra prediction mode of the neighboring block is used to construct the MPM list for the current block.

Hereinafter, a method of deriving six MPM candidates by using the prediction modes at positions L and A shown in (a) of FIG. 14 will be described. Herein, 67 intra prediction modes may include Planar (mode 0), DC (mode 1), and angular modes ranging from a −45 degree angle to a 135 degree angle (mode 2 to mode 66). However, the positions of the neighboring blocks for deriving the MPM candidates are not limited to positions L and A, and the maximum number of the MPM candidates is not limited to six.

When the current block is in a rectangular shape horizontally long, the angular modes at a 135 degree angle or more are provided. When the current block is in a rectangular shape vertically long, the angular modes at a −45 degree angle or less are provided. There are just as many unavailable existing directional angles as there are the expanded directional angles. The prediction modes for the expanded directional angles may be represented by the mode numbers of the prediction modes for the unavailable existing directional angles.

Figure 22:
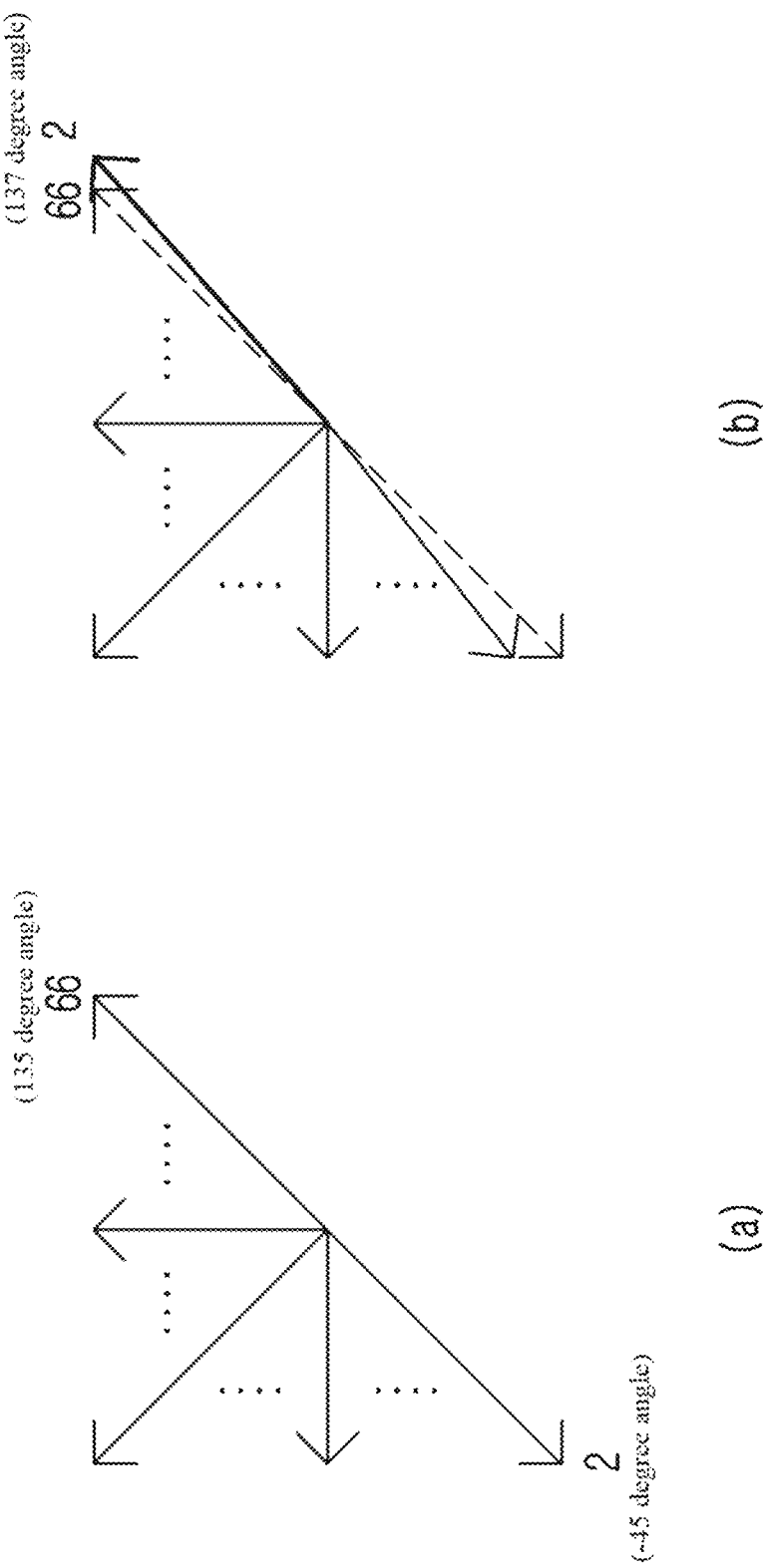
FIG. 22 is a diagram illustrating the mode numbers representing the prediction modes for the expanded directional angles.

FIG. 22 is a diagram illustrating the mode numbers representing the prediction modes for the expanded directional angles.

The existing angular modes and angles are as shown in (a) of FIG. 22.

As shown in (b) of FIG. 22, when the current block is in a rectangular shape horizontally long, the expanded directional angle is, for example, a 137 degree angle (the bold arrow). In this case, the directional angle of −45 degrees is unavailable. Therefore, the prediction mode for a 137 degree angle may be represented by mode 2.

Similarly, when the current block is in a rectangular shape vertically long, the prediction mode for the expanded directional angle of −47 degrees is represented by mode 66.

Figure 23:
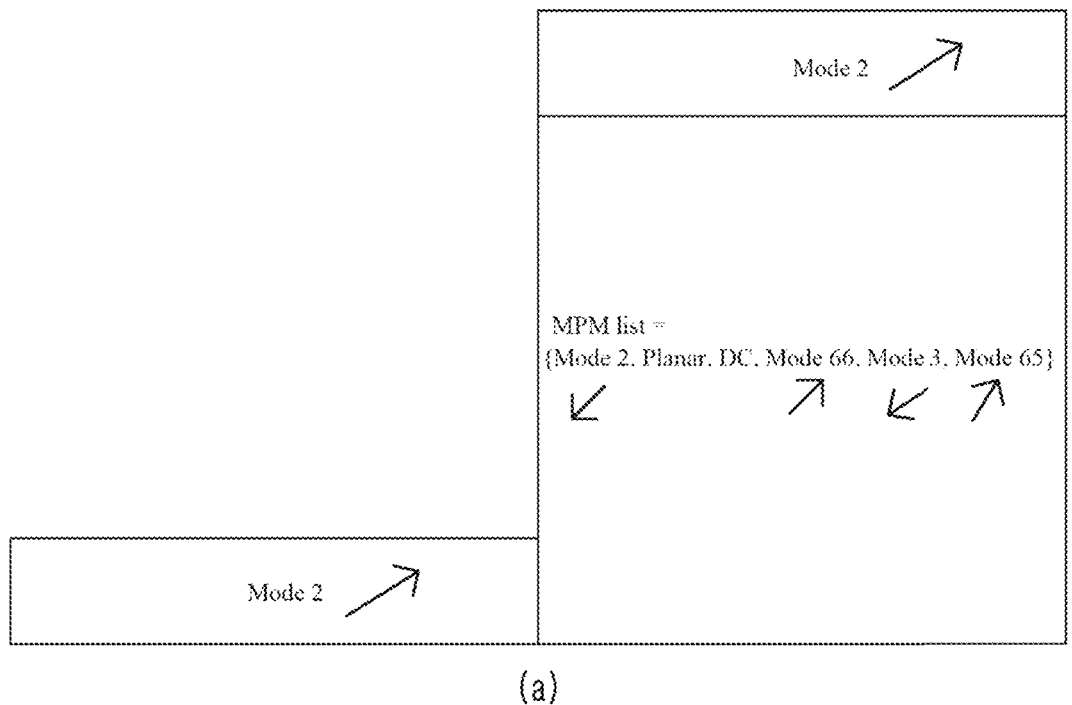
FIG. 23 is a diagram illustrating an example of constructing the MPM list by changing the prediction mode of the neighboring block in accordance with the current block.
Figure 23:
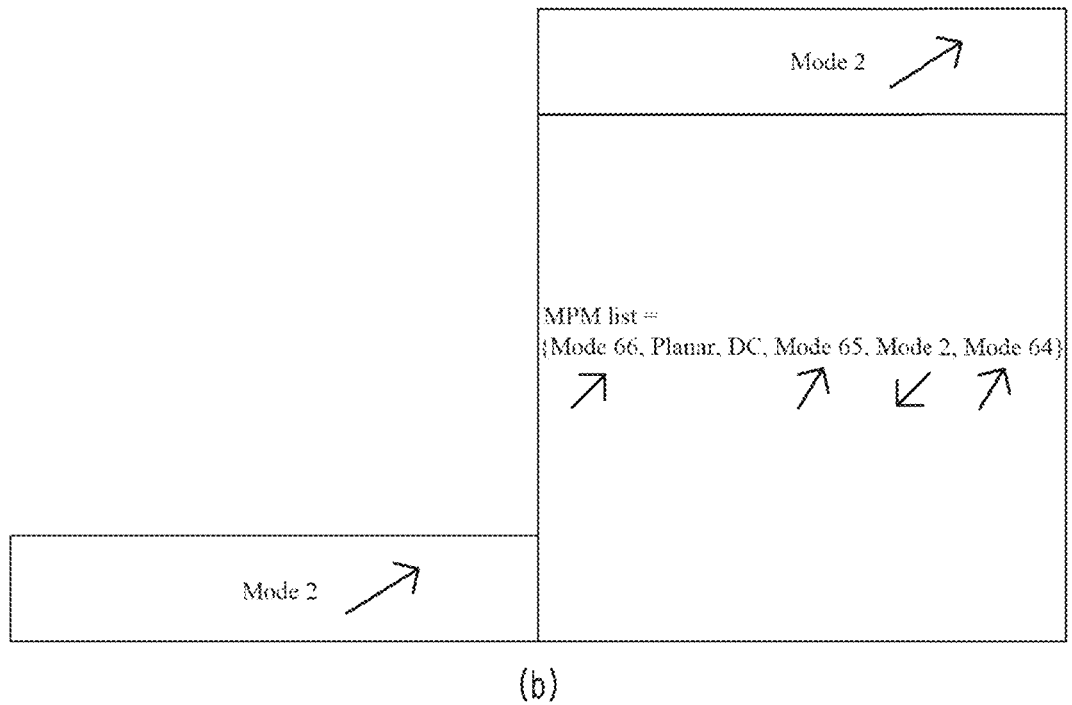

FIG. 23 is a diagram illustrating an example of constructing the MPM list by changing the prediction mode of the neighboring block in accordance with the current block.

As described above, the prediction mode of the neighboring block and the prediction mode of the current block may be opposite to each other in direction. Therefore, according to the size and/or the shape of the current block and the neighboring block, the MPM list for the current block may be adaptively redefined.

For example, when the neighboring block is in a rectangular shape horizontally long and the prediction mode is mode 2, the actual prediction angle exceeds a 135 degree angle. Therefore, the prediction mode of the neighboring block may be redefined to be mode 66 that is the most similar mode among the available modes for the current block in a square shape.

For example, when the neighboring block is in a rectangular shape vertically long and the prediction mode is mode 66, the actual prediction angle does not exceed a −45 degree angle. Therefore, the prediction mode of the neighboring block may be redefined to be mode 2 that is the most similar mode among the available modes for the current block in a square shape.

Using the redefined prediction mode of the neighboring block, the MPM list for the current block may be constructed.

For example, as shown in (a) of FIG. 23, the MPM list for the current block, which is derived using the prediction modes of the neighboring blocks, may be composed of {mode 2, Planar, DC, mode 66, mode 3, mode 65}. The derived MPM list for the current block may be redefined considering the difference in size and/or shape of the current block and the neighboring block. The redefined MPM list as shown in (b) of FIG. 23 may be composed of {mode 66, Planar, DC, mode 65, mode 2, mode 64}.

Figure 24:
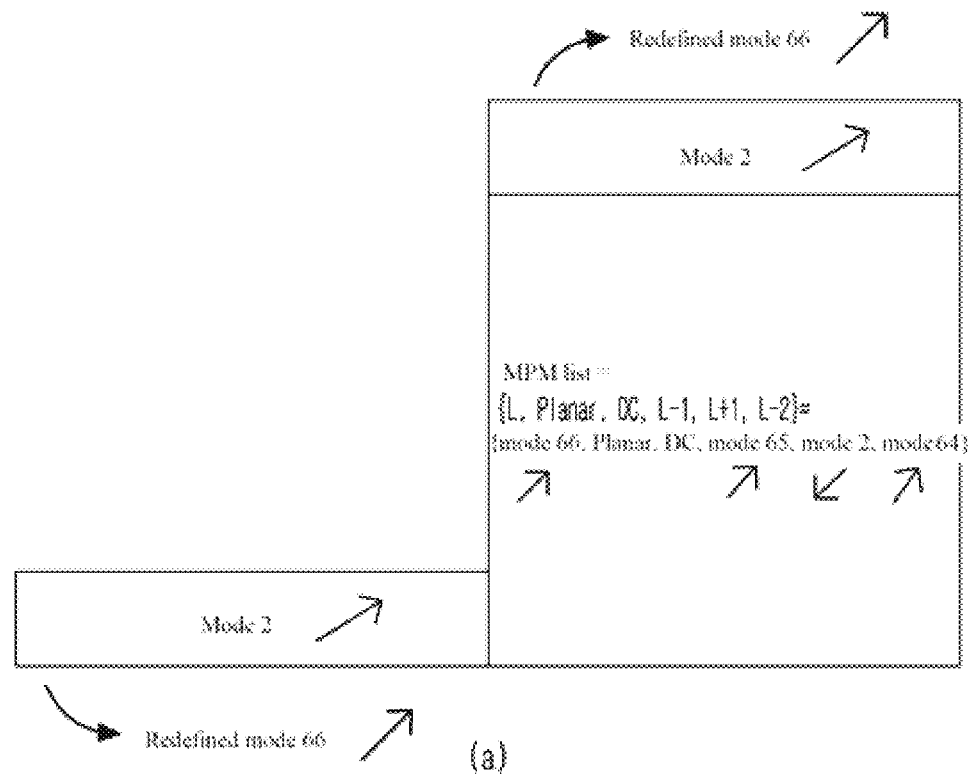
FIG. 24 is a diagram illustrating another example of constructing the MPM list by changing the prediction mode of the neighboring block in accordance with the current block.
Figure 24:
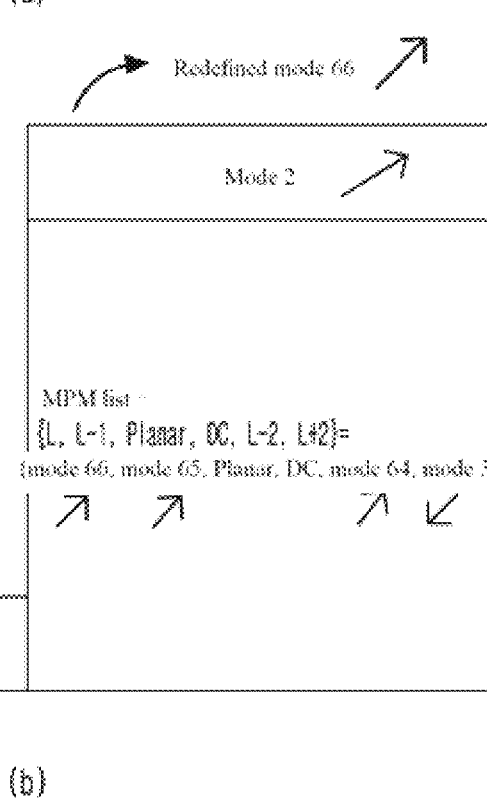

FIG. 24 is a diagram illustrating another example of constructing the MPM list by changing the prediction mode of the neighboring block in accordance with the current block.

In (a) of FIG. 24, before redefining, the neighboring block L and the neighboring block A have the same prediction mode, namely, mode 2. Considering the size and/or the shape of the block, the prediction mode of each neighboring block may be redefined. The redefined modes are mode 66 identically, the MPM list for the current block may be composed of {L, Planar, DC, L−1, L+1, L−2}={mode 66, Planar, DC, mode 65, mode 2, mode 64}.

In (b) of FIG. 24, before redefining, the neighboring block L and the neighboring block A have different prediction modes, namely, mode 2 and mode 3. However, the redefined modes may be mode 66 identically. In this case, the MPM list for the current block may be composed of {L, L−1, Planar, DC, L−2, L+2}={mode 66, mode 65, Planar, DC, mode 64, mode 3}. That is, when the prediction modes of the neighboring blocks before redefining differ but the redefined prediction modes are the same, the MPM list is constructed using mode L+1 (or mode L−1) as the mode of the neighboring block A.

The intra prediction mode of the current block may be entropy encoded/decoded.

The intra prediction mode of the current block may be entropy encoded/decoded on a per-block basis.

Information on intra prediction to be entropy encoded/decoded may include at least one among the following items: a flag indicating whether or not most probable mode (MFM) matching takes place; an index indicating one mode among N MFM modes; a flag indicating whether or not template matching takes place; an index indicating a template matching area; a flag (for example, prev_intra_luma_pred_flag) indicating whether or not most probable mode (MPM) matching takes place; an index (for example, mpm_idx) indicating one candidate among MPM candidates in the MPM list; a flag (for example, selected_mode_set_flag) indicating whether or not the non-MPM candidate modes belong to the selected mode set; an index (for example, selected mode idx) indicating one of modes included in a selected mode set; an index (for example, non_selected_mode_idx) indicating one of non-MPM non-selected modes that are not the MPM candidates and are not included in the selected mode set; intra prediction mode information (for example, rem_intra_luma_pred_mode) for the luma component; intra prediction mode information (for example, intra_chroma_pred_mode) for the chroma component; and an index indicating a reference set for inter color component prediction.

At least one piece of the information on intra prediction may not be signaled on the basis of at least one among the slice type, the size of the block, and the shape.

For example, when the current block is in a predetermined size and/or the current block is in a rectangular shape, at least one piece of the information on intra prediction for the current block is not signaled. In this case, for the information that is not signaled, information on the already encoded/decoded previous block or upper block may be used.

When the information on intra prediction is entropy encoded/decoded, at least one method of the following binarization methods is used.

Truncated rice binarization method
K-th order Exp_Golomb binarization method
Limited K-th order Exp_Golomb binarization method
Fixed-length binarization method
Unary binarization method
Truncated unary binarization method
Truncated binary binarization method When entropy encoding/decoding is performed on the information on intra prediction or on binary information generated through the binarization, at least one among the following items is used.

Context-based adaptive binary arithmetic coding (CABAC)
Context-based adaptive variable length coding (CAVLC)
Bypass coding The entropy encoding/decoding may be adaptively performed on the information on the intra prediction or on the binary information by using at least one among the slice type, the size, and the shape of the current block, and the prediction mode of the neighboring block.

For example, when the intra prediction mode of the left neighboring block and the intra prediction mode of the top neighboring block are the same, CABAC is performed, When the intra prediction mode of the left neighboring block and the intra prediction mode of the top neighboring block differ, bypass coding is performed.

For example, when the intra prediction mode of the left neighboring block and the intra prediction mode of the top neighboring block are the same, CABAC is performed using a first context model. When the intra prediction mode of the left neighboring block and the intra prediction mode of the top neighboring block differ, CABAC is performed using a second context model.

For example, when the slice type of the current block is slice I, CABAC is performed using the first context model. When the slice type of the current block is slice P, CABAC is performed using the second context model. When the slice type of the current block is slice B, CABAC is performed using a third context model.

An example of deriving the intra prediction mode of the current block by using the MFM and the MPM will be described with reference to (b) of FIG. 14.

As shown in (b) of FIG. 14, in order to derive the MFM and/or the MPM, intra prediction modes of neighboring blocks L, A, LB, AR, and AL of the current block may be used. For example, among the intra prediction modes of the neighboring blocks, the intra prediction mode with the highest frequency of occurrence may be determined as the MFM. The derivation sequence for the intra prediction modes of the neighboring block may be L, A, LB, AR, and AL, in that order. When there are one or more intra prediction modes with the highest frequency of occurrence, the first derived mode is determined as the MFM. When the intra prediction mode of the current block matches the derived MFM, the flag MFM_flag indicating whether or not matching takes place is set to have a first value (for example, "1") and then is signaled.

In addition, N MPM candidates may be derived. For example, three MPM candidates may be derived. The intra prediction mode of the neighboring block that is the same as the neighboring block used in deriving the MFM may be derived as the MPM candidate. The derivation sequence for the MPM candidates may be L, A, Planar, DC, LB, AR, AL, Vertical, Horizontal, in that order. Three modes that do not match the MFM may be determined as the MPM candidates. When MFM_flag has a second value (for example, "0"), the flag MPM_flag indicating whether or not the intra prediction mode of the current block is any of the derived MPM candidates is signaled.

When MPM_flag has a first value (for example, "1"), index information MPM_idx indicating the mode among the MPM candidates, which is the same as the intra prediction mode of the current block, is signaled additionally. In order to signal MPM_idx, context encoding/decoding may be performed on one or more bins. For example, encoding/decoding using one or more (for example, two) context models may be performed on the first bin for MPM_idx. When encoding/decoding using the context models is performed on the first bin for MPM_idx, the intra prediction mode of the neighboring block is used. For example, when the intra prediction mode of the neighboring block A and the intra prediction mode of the neighboring block L are the same, a first context model is used. When the intra prediction mode of the neighboring block A and the intra prediction mode of the neighboring block L differ, a second context model is used. Alternatively, when the intra prediction mode of the neighboring block A and the intra prediction mode of the neighboring block L are the same, the context model is used. When the intra prediction mode of the neighboring block A and the intra prediction mode of the neighboring block L differ, bypass encoding/decoding is performed.

When MPM flag has a second value (for example, "0"), entropy encoding/decoding is performed on the remaining modes. Herein, when the number of the remaining modes is not 2n, the intra prediction mode of the current block is encoded/decoding using the truncated binary binarization method.

An example of deriving the intra prediction mode of the current block by using the MFM will be described with reference to (b) of FIG. 14.

As shown in (b) of FIG. 14, the intra prediction modes of neighboring blocks L, A, LB, AR, and AL of the current block may be used. For example, depending on the frequency of occurrence of the intra prediction modes of the neighboring blocks MFM 0, MFM 1, MFM 2, . . . , MFM N may be determined. For example, there may be four MFMs. The sequence of the neighboring blocks for deriving the MFMs may be L, A, Planar, DC, LB, AR, AL, Vertical, and Horizontal, in that order. When there are multiple modes having the same frequency of occurrence, MFMs are derived in that order.

The flag MFM0_flag indicating whether or not MFM 0 matches the intra prediction mode of the current block may be signaled. When MFM0_flag has a first value (for example, "1"), MFM 0 is determined as the intra prediction mode of the current block and other information on the intra prediction mode is not signaled. When MFM0_flag has a second value (for example, "0"), MFM_flag indicating whether or not any of MFM 1, MFM 2, . . . , MFM N is the same as the intra prediction mode of the current block is signaled. When MFM_flag has a first value (for example, "1"), MFM idx indicating one of N MFMs is signaled additionally. When MFM_flag has a second value (for example, "0"), information for determining the intra prediction mode of the current block from the intra prediction modes except for MFM 0 to MFM N is signaled.

An example of deriving the intra prediction mode of the current block by using the MPM will be described with reference to (b) of FIG. 14.

As shown in (b) of FIG. 14, the intra prediction modes of neighboring blocks L, A, LB, AR, and AL of the current block may be used. For example, three MPM candidates may be derived. Among the intra prediction modes of the neighboring blocks, the intra prediction mode with the highest frequency of occurrence may be derived as MPM 0. The sequence of deriving the intra prediction modes of the neighboring blocks may be, for example, L, A, LB, AR, and AL, in that order. When there are two or more intra prediction modes with the highest frequency of occurrence, the first derived mode is determined as MPM 0. When the intra prediction mode of the current block matches MPM 0, the flag MPM0_flag indicating whether or not matching takes place is set to have a first value (for example, "1") and then is signaled.

In addition, two MPM candidates may be derived. For example, according to the sequence, L, A, Planar, DC, LB, AR, AL, and Vertical, two modes that does not match MPM 0 may be selected and determined as MPM 1 and MPM 2. In FIG. 14, other drawings of the present invention, and the description of the specification, block identification letters such as L, A, or the like may also refer to the intra prediction modes of the corresponding blocks. When MPM0_flag has a second value (for example, "0"), the flag MPM_flag indicating whether or not the intra prediction mode of the current block matches any of the derived MPM 1 and the derived MPM 2 is signaled. When MPM_flag has a first value (for example, "1"), index information MPM_idx indicating one of the MPM candidates except for MPM 0 is signaled additionally. The MPM candidate indicated by MPM_idx may be set as the intra prediction mode of the current block.

MPM_idx and information on the remaining modes may be encoded/decoding using at least one method among the above-described various entropy encoding/decoding methods.

In the above examples, in order to count the frequency of occurrence of the intra prediction modes of the neighboring blocks, the intra prediction modes of neighboring blocks L, A, LB, AR, and AL are used, but the neighboring blocks are not limited to the above examples.

At step S520, the reference sample may be constructed.

In order to perform intra prediction on the basis of the derived intra prediction mode, the reference sample may be reconstructed. The reference sample may be constructed using one or more reconstructed samples around the current block or a combination thereof. Further, filtering may be applied to the constructed reference sample. Each of the reconstructed samples on multiple reconstructed sample line may be used as it is to construct the reference sample. Alternatively, through filtering between samples on the same reconstructed sample line, the reference sample may be constructed. Alternatively, through filtering between samples on different reconstructed sample lines, the reference sample may be constructed. The constructed reference sample may be represented by ref[m, n], and the neighboring reconstructed sample or the sample obtained by filtering the same may be represented by rec[m, n]. Herein, m or n may be a predetermined integer. When the horizontal and vertical sizes of the current block are represented by W and H, respectively, and the position of the upper left sample within the current block is (0, 0), the position of the upper left reference sample of the current block is set to be (−1, −1).

The reference sample may be constructed using one or more reconstructed sample lines adjacent to the current block.

The reference sample may be constructed selecting one line among multiple reconstructed sample lines shown in FIG. 7. Herein, an indicator for the selected reconstructed sample line may be signaled.

Alternatively, the reference sample may be constructed using a combination of two or more reconstructed sample lines in FIG. 7. For example, as shown in Equation 1, the reference sample may be constructed using a weighted sum in which different weighting factors are assigned depending on the distance from the current block.

$$ref[-1,-1]=rec[-2,-1]+2*rec[-1,-1]+rec[-1,-2]+2) >>2$$

$$ref[x,-1]=(rec[x,-2]+3*rec[x,-0.1]+2)>2,(x=02*W-1)$$

$$ref[-1,y]=(rec[-2,y]+3*rec[-1,y]+2)>>2,(y=02*H-1) \quad \text{[Equation 1]}$$

On the basis of at least one among the distance from the current block and the intra prediction mode of the current block, at least one among the average value, the maximum value, the minimum value, and the median value of the multiple reconstructed samples is calculated, thereby constructing the reference sample.

Through this process, one or more reference sample lines may be constructed.

The top reference sample of the current block and the left reference sample of the current block may be constructed in different manners. Information indicating the method used in constructing the reference sample may be encoded/decoded. For example, information indicating whether or not multiple reconstructed sample lines are used may be encoded/decoded.

Availability for the neighboring reconstructed sample used to construct the reference sample may be determined.

For example, when the neighboring reconstructed sample is positioned outside at least one region among the picture, the slice, the tile, and the CTU, which include the current block, it is determined that the neighboring reconstructed sample is unavailable. For example, when the neighboring reconstructed sample is included in the inter predicted block, it is determined that the neighboring reconstructed sample is unavailable.

When it is determined that the neighboring reconstructed sample is unavailable, another available neighboring reconstructed sample is used to replace the unavailable neighboring reconstructed sample. For example, the unavailable neighboring reconstructed sample may be replaced using at least one method among the following methods.

Figure 15:
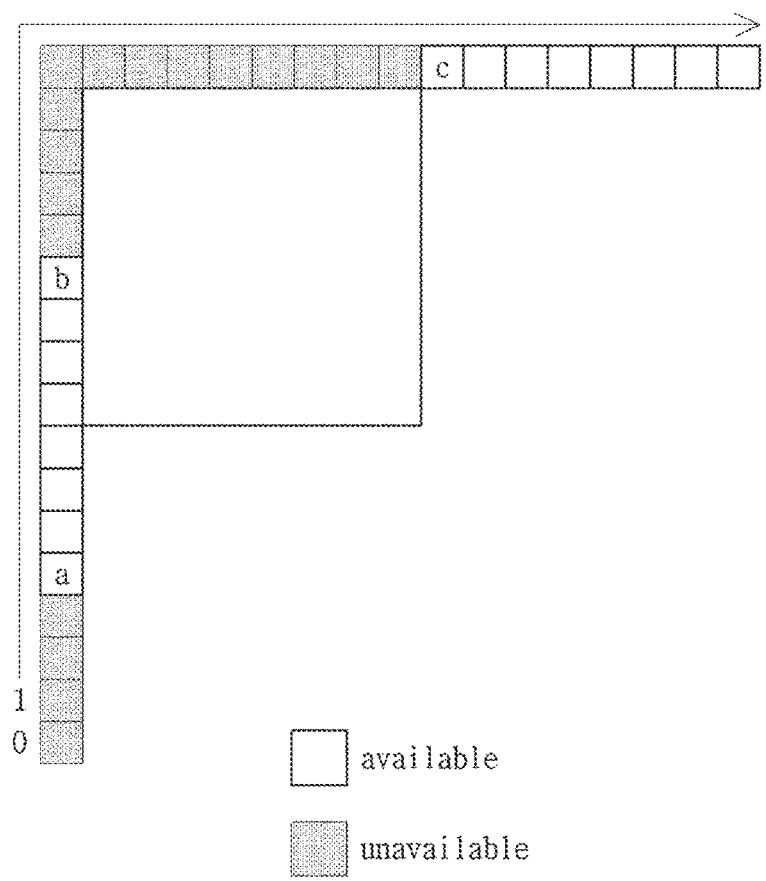
FIG. 15 is a diagram illustrating an example of using an available sample to replace an unavailable sample.

FIG. 15 is a diagram illustrating an example of using an available sample to replace an unavailable sample.

For example, the unavailable samples may be filled with the available samples starting from the position of the lower left sample, which is denoted by the numeral 0. For example, in the example shown in FIG. 15, the first four unavailable samples may be filled with the sample value, which is "a", of the first available sample. Further, the subsequent 13 unavailable samples may be filled with the sample value, which is "b", of the immediately preceding available sample.

For example, the unavailable samples may be filled using a combination of available samples. For example, the unavailable samples may be filled using the available samples positioned at the both ends of a group of the unavailable samples. In this case, the first four unavailable samples may be filled with the sample value, which is "a", of the first available sample. Then, the subsequent 13 unavailable samples may be filled using the sample values, which are "b" and "c", of two available samples. For example, the average value or the weighted average value of "b" and "c" may be used. The weighting factor applied to the weighted average value may be inversely proportional to the distance to the available sample. That is, the available sample positioned at the short distance to the current unavailable sample may be assigned a large weighting factor.

Filtering may be applied to the one or more constructed reference samples. Herein, whether or not filtering is applied may be determined on the basis of at least one among the intra prediction mode, the size, and the shape of the current block. Further, when filtering is applied, the filter type may vary on the basis of at least one among the intra prediction mode, the size, and the shape of the current block.

When multiple reference sample lines are used, filtering is applied differently for each reference sample line. For example, whether or not filtering is applied may vary, or the filter type may vary. For example, filtering may be applied to the first reference sample line adjacent to the current block, and filtering may not be applied to the second reference sample line. For example, different types of filters may be applied to the first reference sample line and the second reference sample line.

When performing intra prediction, both the reference sample to which the filtering is applied and the reference sample to which the filtering is not applied are used.

When applying the filtering, at least one among a 3-tap filter, a 5-tap filter, and a 7-tap filter is selected and applied on the basis of at least one among the intra prediction mode, the size, and the shape of the current block.

At step S530, on the basis of the derived intra prediction mode and the reference sample, intra prediction may be performed on the current block.

For example, non-angular intra prediction may be performed on the current block. The non-angular intra prediction mode may be any mode except for the angular modes.

Alternatively, angular intra prediction may be performed on the current block. The angular prediction mode may be performed using at least one among the modes with various angles including the horizontal mode and the vertical mode.

Alternatively, intra prediction based on positional information may be performed on the current block. The positional information may be encoded/decoded, and the reconstructed block at the position may be derived as the intra prediction block of the current block. Alternatively, the decoder may search for a block similar to the current block. The found block may be derived as the intra prediction block of the current block. The reconstructed block or the found block may be the reconstructed block included in the current picture.

Alternatively, inter color component intra prediction may be performed on the current block.

To perform inter color component intra prediction, at least one linear model may be constructed.

To construct the linear model, a parameter that minimizes a regression error between the luma component and the color component may be determined.

Figure 16:
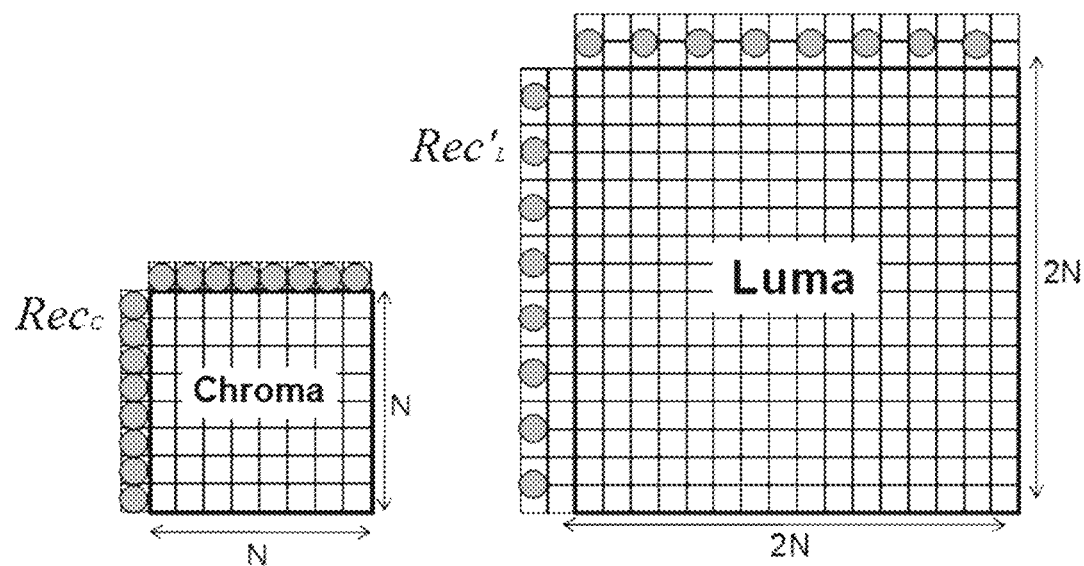
FIG. 16 is a diagram illustrating a method of determining a linear parameter for inter color component prediction.

FIG. 16 is a diagram illustrating a method of determining a linear parameter for inter color component prediction.

The linear parameters α and β of the current block may be determined by Equation 2 using the positions of the reference samples shown in FIG. 16.

$$\alpha = \frac{N\sum(L(n)C(n)) - \sum L(n)\sum C(n)}{N\sum(L(n)L(n)) - \sum L(n)\sum L(n)} \beta = \frac{\sum(C(n)) - \alpha \sum L(n)}{N} \quad \text{[Equation 2]}$$

When there are two or more linear models, multiple linear parameters are determined.

Various positions of the samples to be referenced to determine the linear parameters may be constructed.

Different reference samples may be constructed depending on the intra prediction mode of the already encoded/decoded luma block.

Figure 17:
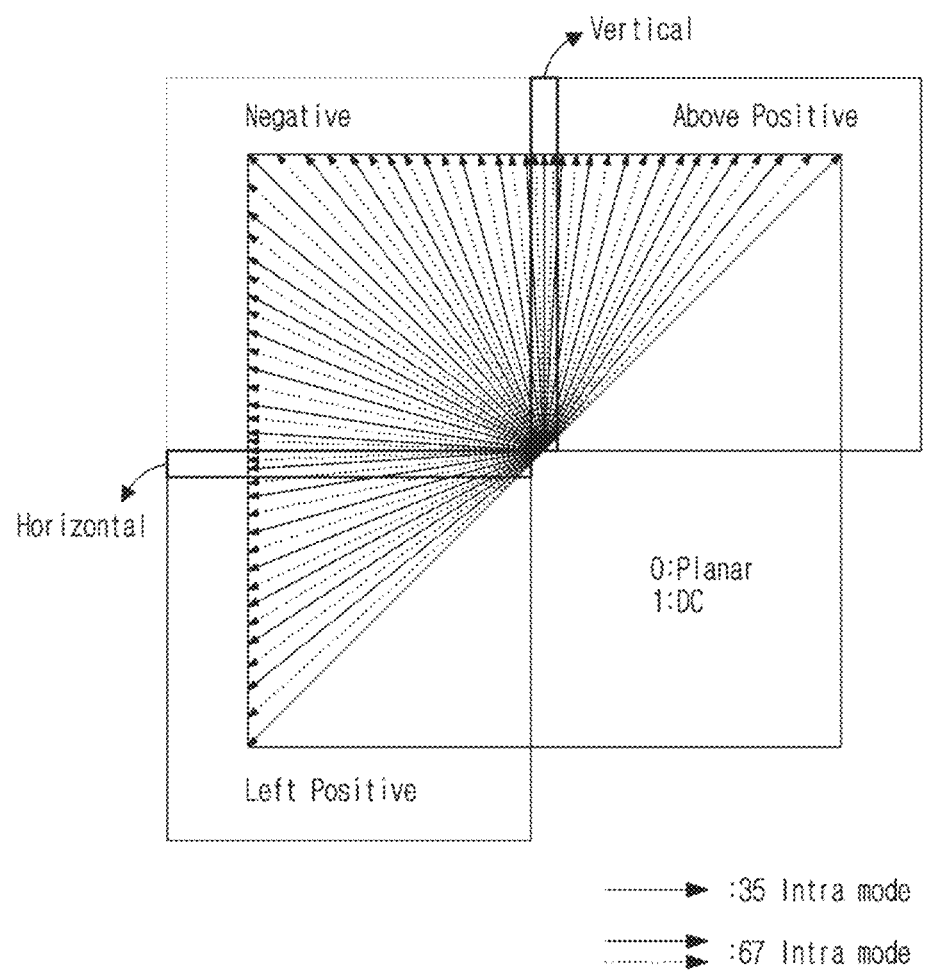
FIG. 17 is a diagram illustrating an example of classifying directions of the intra prediction modes.

FIG. 17 is a diagram illustrating an example of classifying directions of the intra prediction modes.

As shown in FIG. 17, the angular mode among the intra prediction modes may be classified as having one direction among the directions of Left Positive, Above Positive, and Negative modes.

Figure 18:
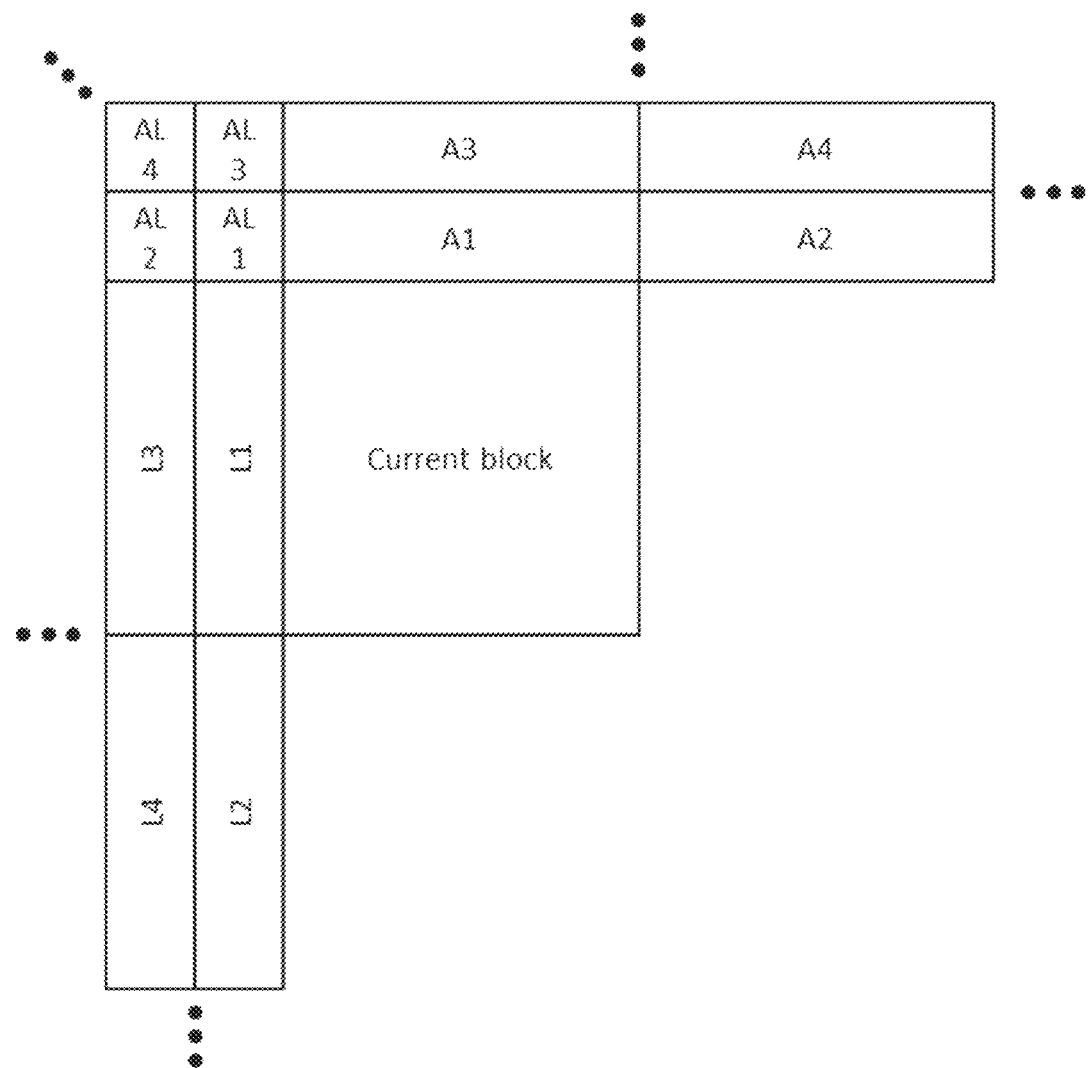
FIG. 18 is a diagram illustrating a method of constructing the reference sample depending on the intra prediction mode.

FIG. 18 is a diagram illustrating a method of constructing the reference sample depending on the intra prediction mode.

As shown in FIG. 18, the reference sample may be constructed using at least one among the reference sample regions around the current block. The reference sample region may be composed of one or more reference sample lines.

For example, when the intra prediction mode of the luma block is the non-angular mode, one or more linear models are constructed using one or more reference sample lines.

For example, when the intra prediction mode of the luma block is one of the Left Positive modes, one or more linear models are constructed using one or more reference samples among the left samples (L1, L2, . . . ).

For example, when the intra prediction mode of the luma block is one of the Above Positive modes, one or more linear models are constructed using one or more reference samples among the top samples (A1, A2, . . . ).

For example, when the intra prediction mode of the luma block is the Vertical mode, one or more linear models are constructed using one or more reference samples among the top samples (A1, A3, . . . ).

For example, when the intra prediction mode of the luma block is the Horizontal mode, one or more linear models are constructed using one or more reference samples among the left samples (L1, L3, . . . ).

For example, when the intra prediction mode of the luma block is one of the Negative modes, one or more linear models are constructed using one or more reference samples among the top left samples (AL), the top samples (A), and the left samples (L).

Herein, the constructed reference sample for the luma block may be used to replace the reference sample for the chroma block according to the linear parameter, whereby the current chroma block is intra predicted. Herein, at least one among the prediction mode of the encoded/decoded luma block and the existing chroma prediction mode may be selected as the intra prediction mode of the current chroma block.

To construct the linear model, a parameter that minimizes the regression error between two color components Cb and Cr may be determined.

Using the positions of the reference samples shown in FIG. 16, the linear parameter of the current block may be determined.

For example, the linear parameter for deriving the chroma component Cr by using the chroma component Cb may be determined as shown in Equation 3.

$$\alpha = \frac{N\sum(Cb(n)Cr(n)) - \sum Cb(n)\sum Cr(n) + \lambda(-0.5)}{N\sum(Cb(n)Cr(n)) - \sum Cb(n)\sum Cr(n) + \lambda} \lambda = \quad \text{[Equation 3]}$$

$$\sum(Cb(n)Cb(n)) \gg 9$$

For example, the linear parameter for deriving another chroma component Cb by using the chroma component Cr may be determined as shown in Equation 4.

$$\alpha = \frac{N\sum(Cr(n)Cb(n)) - \sum Cr(n)\sum Cb(n) + \lambda(-0.5)}{N\sum(Cr(n)Cb(n)) - \sum Cr(n)\sum Cb(n) + \lambda} \lambda = \quad \text{[Equation 4]}$$

$$\sum(Cr(n)Cr(n)) \gg 9$$

Herein, an indicator for selected inter color component prediction may be signaled.

Various positions of the reference samples used to determine the linear parameter may be constructed. For example, a linear model may be constructed using the same reference sample region for the luma component and the chroma component.

Considering complexity of operation, the linear parameter is derived using simple operation, thereby constructing the linear model.

For example, the linear model using the positions of the reference samples shown in FIG. 16 may be represented as follows. The linear parameter for the linear model of the current block may be determined as in Equation 5.

$$Pred_c = \alpha \times Rec_L + \beta \quad \text{[Equation 5]}$$
$$\alpha = \frac{C_A - C_B}{L_A - L_B}, \beta = C_c - \alpha L_c$$

When there are m linear models being used, m linear parameters ($\alpha_1$–$\alpha_m$, $\beta_1$–$\beta_m$) are determined.

The m models may differ from each other in some cases.

For example, the model to use may be determined by assigning a Threshold depending on $Rec_L$.

For example, when m, which indicates the number of the linear models, is 1, the parameters $\alpha$ and $\beta$ are determined by combining various models.

For example, when there are parameters $\alpha_1$ and $\alpha_2$, the parameter $\alpha$ is determined to be the average of the parameters $\alpha_1$ and $\alpha_2$.

For example, when there are parameters $\beta_1$ and $\beta_2$, the parameter $\beta$ is determined to be the average of the parameters $\beta_1$ and $\beta_2$.

To derive the parameters $\alpha$ and $\beta$, the reference samples may be used as follows. Further, at least one method is used for each of the m models to derive the parameters $\alpha$ and $\beta$.

Herein, $L_A$ and $L_B$ may be the reference samples for the luma component, and $C_A$ and $C_B$ may be the reference samples for the chroma component.

For example, $L_A$ may be the n-th maximum value of the reference samples for the luma component, and $L_B$ may be the n-th minimum value of the reference samples for the luma component. $C_A$ and $C_B$ may be the reference sample values for the chroma component corresponding to $L_A$ and $L_B$, respectively.

For example, $L_A$ may be an average of the n-th maximum value and the n−1-th maximum value of the reference samples for the luma component. $L_B$ may be an average of the n-th minimum value and the n−1-th minimum value of the reference samples for the luma component. Herein, $C_A$ may be an average of the reference sample values for the chroma component corresponding to the n-th maximum value and the n−1-th maximum value of the reference samples for the luma component. Further, $C_B$ may be an average of the reference sample values for the chroma component corresponding to the n-th minimum value and the n−1-th minimum value of the reference samples for the luma component. Herein, n may be 2. In this case, $L_A$ may be an average of the first and second maximum values of the reference samples for the luma component, and $L_B$ may be an average of the first and second minimum values. Further, $C_A$ may be an average of the reference sample values for the chroma component corresponding to the first maximum value and the second maximum value of the reference samples for the luma component. Further, $C_B$ may be an average of the reference sample values for the chroma component corresponding to the first minimum value and the second minimum value of the reference samples for the luma component.

For example, $L_A$ may be the n-th maximum value of the reference samples for the luma component. $L_B$ may be the n-th minimum value of the reference samples for the luma component. Herein, $C_A$ may be the n-th maximum value of the reference samples for the chroma component, and $C_B$ may be the n-th minimum value of the reference samples for the chroma component.

For example, $L_A$ may be an average of the n-th maximum value and the n−1-th maximum value of the reference samples for the luma component. $L_B$ may be an average of the n-th minimum value and the n−1-th minimum value of the reference samples for the luma component. Herein, $C_A$ may be an average of the n-th maximum value and the n−1-th maximum value of the reference samples for the chroma component. $C_B$ may be an average of the n-th minimum value and the n−1-th minimum value of the reference samples for the chroma component.

For example, on the basis of the average of the all luma components, the reference samples for the luma component may be divided into two groups. Herein, $L_A$ may be an average of the reference samples of a first group for the luma component, and $L_B$ may be an average of the reference samples of a second group for the luma component. Herein, $C_A$ may be an average of the reference samples of a first group for the chroma component, and $C_B$ may be an average of the reference samples of a second group for the chroma component.

Further, $L_C$ may be the reference sample for the luma component, and $C_C$ may be the reference sample for the chroma component.

For example, $L_C$ may be the n-th minimum value or maximum value of the reference samples for the luma component, and $C_C$ may be the reference sample value for the chroma component corresponding to $L_C$.

For example, $L_C$ may be the average value of the all reference samples for the luma component, and $C_C$ may be the average value of all reference samples for the chroma component.

For example, $L_C$ may be an average value (for example, (maximum value+minimum value+1)>>1) of the maximum value and the minimum value of the reference samples for the luma component. $C_C$ may be an average value of the maximum value and the minimum value of the reference samples for the chroma component.

Different reference samples may be constructed depending on at least one among the size, the shape of the block, and whether or not the neighboring block is intra predicted.

For example, when the size of the current block is smaller than a predetermined size, one or more linear models are constructed using one or more reference sample lines.

Figure 19:
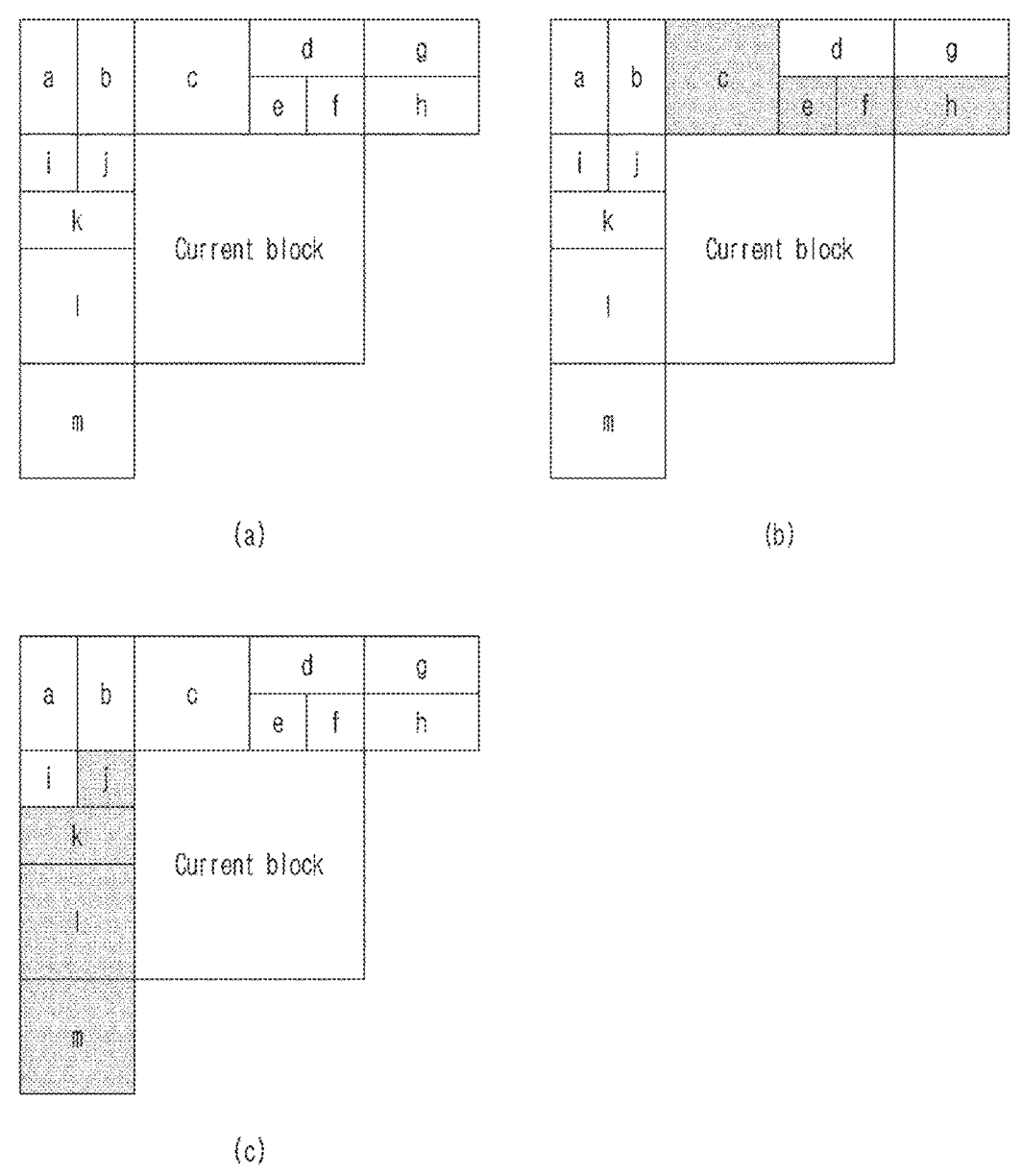

FIG. 19 is a diagram illustrating a method of constructing a linear model depending on the prediction mode of the neighboring block.

In FIG. 19, the block a to the block m are the neighboring blocks of the current block. The shaded blocks are inter predicted blocks, and the remaining blocks are intra predicted blocks.

As shown in (a) of FIG. 19, when all the neighboring blocks of the current block are intra predicted, a linear model is constructed using at least one among the samples that belong to the intra predicted neighboring blocks.

As shown in (b) of FIG. 19, when some top neighboring blocks among the neighboring blocks of the current block are inter predicted, a linear model is constructed using at least one among the samples that belong to the intra predicted neighboring blocks.

As shown in (c) of FIG. 19, when some left neighboring blocks among the neighboring blocks of the current block are inter predicted, a linear model is constructed using at least one among the samples that belong to the intra predicted neighboring blocks.

Various sets of reference samples may be constructed, and an index indicating a set of the reference sample used herein may be encoded/decoded.

Different sets of reference samples may be constructed depending on the size of the current block.

Referring to FIG. 18, various examples of constructing a set of reference samples will be described.

In the case where the current block is in a 4×4 size, various groups, such as {A1, L1}, {A1, A2, L1, L2}, {A1, A3, L1, L3}, {A1, A3, A5, L1, L3, L5}, {A1, A2, A5, L1, L3, L5}, and the like, are constructed, and at least one group is selected thereamong, thereby constructing the set of reference samples.

In the case wherein the current block is in an 8×8 size, various groups, such as {A1, L1}, {A1, A2, L1, L2}, {A1, A3, L1, L3}, and the like, are constructed, and at least one group is selected thereamong, thereby constructing the set of reference samples.

The 4×4-sized or 8×8-sized block is set as a unit block, and the set of reference samples may be constructed on the basis of at least one among the unit blocks with respect to the current block in an arbitrary size. Alternatively, a combination of two or more unit blocks may be used. Herein, various groups, such as {A1, L1}, {A1, A2, L1}, {L1, L2, A1}, {L1, L2, L3, L4, A1}, {A1, A2, A3, A4, L1}, and the like, are constructed, and at least one group is selected thereamong, thereby constructing the set of reference samples.

Different sets of reference samples may be constructed depending on the intra prediction mode of the current block.

Figure 20:
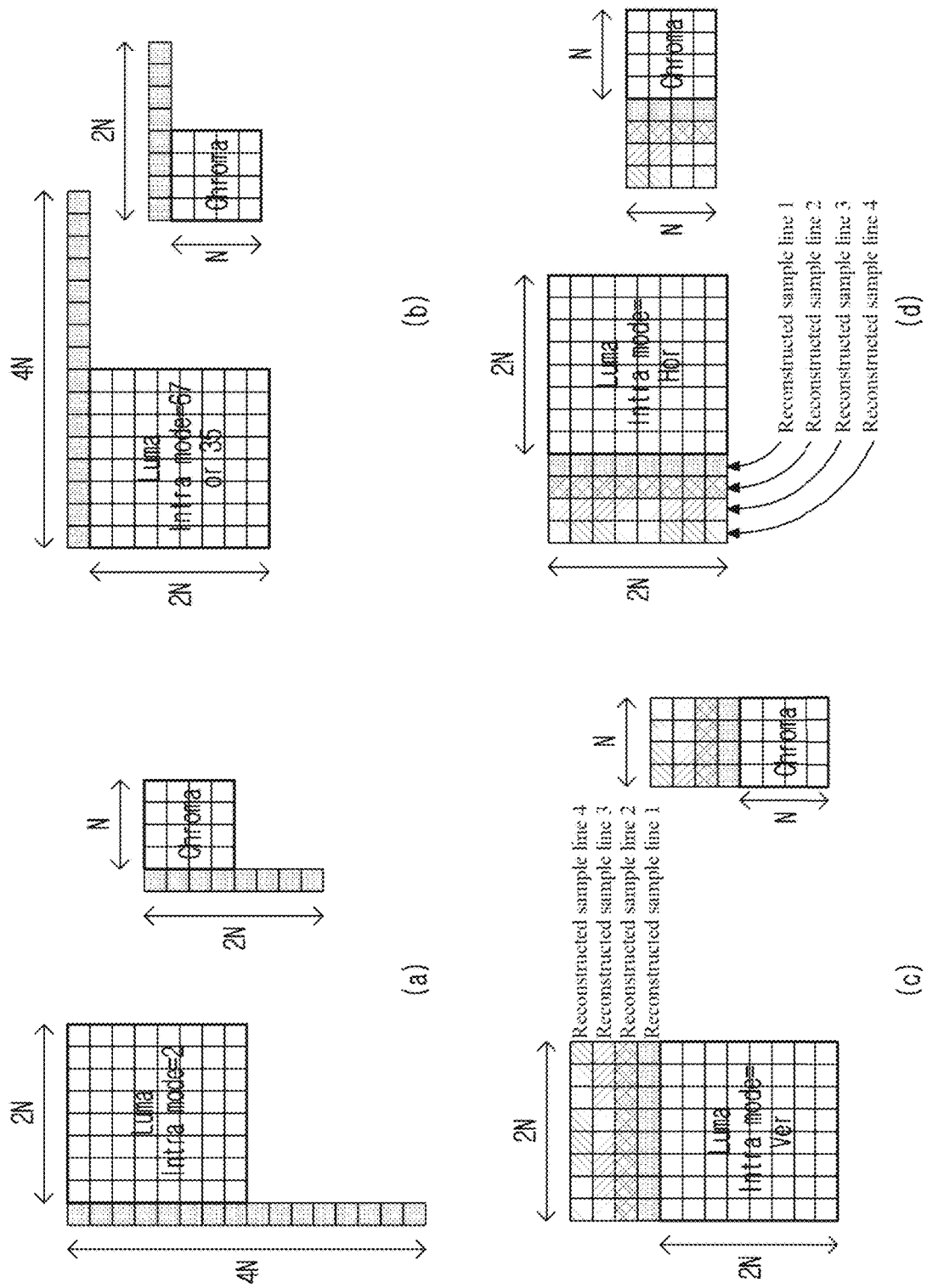
FIG. 20 is a diagram illustrating a set of reference samples depending on the intra prediction mode.

FIG. 20 is a diagram illustrating a set of reference samples depending on the intra prediction mode.

In the case where the intra prediction mode of the current block is non-angular, various groups, such as {L1, A1}, {L3, A3}, {L1, L3, A1, A3}, {L1, L3, L5, A1, A3, A5}, and the like, are constructed, and at least one group is selected thereamong, thereby constructing the set of reference samples.

In the case where the intra prediction mode of the current block is the Left Positive prediction mode, various groups, such as {L1, L2}, {L1, L2, AL1}, {L1, L4, AL1}, {L1, L2, L3, L4, AL1}, {L1, L2, L3, L4, L5, L6}, {L1, L2, L3, L4, AL1, AL2, AL3, AL4}, and the like, are constructed, and at least one group is selected thereamong, thereby constructing the set of reference samples. For example, as shown in (a) of FIG. 20, the set of reference samples may be constructed to be a group composed of {L1, L2}.

In the case where the intra prediction mode of the current block is the Above Positive prediction mode, various groups, such as {A1, A2}, {A1, A2, AL1}, {A1, A4, AL1}, {A1, A2, A3, A4, AL1}, {A1, A2, A3, A4, A5, A6}, {A1, A2, A3, A4, AL1, AL2, AL3, AL4}, and the like, are constructed, and at least one group is selected thereamong, thereby constructing the set of reference samples. For example, as shown in (b) of FIG. 20, the set of reference samples may be constructed to be a group composed of {A1, A2}.

In the case where the intra prediction mode of the current block is the Vertical prediction mode, various groups, such as {A1}, {A1, A3}, {A1, A3, A5}, and the like, are constructed, and at least one group is selected thereamong, thereby constructing the set of reference samples. For example, as shown in (c) of FIG. 20, the set may be constructed to be a group composed of {A1, A3, A5, A7}.

In the case where the intra prediction mode of the current block is the Horizontal prediction mode, various groups, such as {L1}, {L1, L3}, {L1, L3, L5}, and the like, are constructed, and at least one group is selected thereamong, thereby constructing the set of reference samples. For example, as shown in (d) of FIG. 20, the set may be constructed to be a group composed of {L1, L3, L5, L7}.

In the case where the intra prediction mode of the current block is the Negative prediction mode, various groups, such as {L1, A1, AL1}, {L1, L2, A1, A2, AL1}, {L1, L3, A1, A3, AL1, AL2, AL3, AL4}, {L1, L2, L3, L4, A1, A2, A3, A4, AL1, AL2, AL3, AL4}, and the like, are constructed, and at least one group is selected thereamong, thereby constructing the set of reference samples.

Different sets of reference samples may be constructed depending on the type of downsampling filter applied to the current block for the luma component.

For downsampling, at least one among a 2-tap filter, a 4-tap filter, and a 6-tap filter may be selectively applied.

In the case of the downsampling filter using the luma sample in the vertical direction, various groups, such as {A1}, {A1, A3}, {A1, A3, A5}, and the like, are constructed, and at least one group is selected thereamong, thereby constructing the set of reference samples.

In the case of the downsampling filter using the luma sample in the horizontal direction, various groups, such as {L1}, {L1, L3}, {L1, L3, L5}, and the like, are constructed, and at least one group is selected thereamong, thereby constructing the set of reference samples.

In the case of the downsampling filter using the luma sample in a −45 degree diagonal direction, various groups, such as {L1, A1, AL1}, {L1, L2, A1, A2, AL1}, {L1, L3, A1, A3, AL1, AL2, AL3, AL4}, {L1, L2, L3, L4, A1, A2, A3, A4, AL1, AL2, AL3, AL4}, and the like, are constructed, and at least one group is selected thereamong, thereby constructing the set of reference samples.

In the case of the downsampling filter using luma samples in the horizontal direction, the vertical direction, and the −45 degree diagonal direction, various groups, such as {L1, A1}, {L3, A3}, {L1, L3, A1, A3}, {L1, L3, L5, A1, A3, A5}, and the like, are constructed, and at least one group is selected thereamong, thereby constructing the set of reference samples.

An index for indicating one of multiple reference sample sets may be entropy encoded/decoded. Herein, at least one method among the following methods may be used: the truncated rice binarization method, the K-th order Exp_Golomb binarization method, the limited K-th order Exp_Golomb binarization method, the fixed-length binarization method, the unary binarization method, the truncated unary binarization method, and the truncated binary binarization method.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method comprising:

reconstructing a most frequent mode (MFM) indicator indicating whether an intra prediction mode of a current block is a predetermined intra prediction mode;

deriving, on the basis of the MFM indicator, the intra prediction mode of the current block; and generating a prediction block of the current block by performing intra prediction on the current block on the basis of the intra prediction mode, wherein when the MFM indicator has a first value, the intra prediction mode of the current block is derived to be the predetermined intra prediction mode, wherein when the MFM indicator has a second value, the intra prediction mode of the current block is derived on the basis of a most probable mode (MPM) list if a predetermined condition is satisfied, the MPM list constructed on the basis of intra prediction modes of neighboring blocks of the current block and, wherein the MFM indicator is reconstructed from a bitstream only when a MPM indicator related to a most probable mode has a predetermined value.

2. The image decoding method of claim 1, wherein the predetermined intra prediction mode is a Planar mode.

3. An image encoding method comprising:
determining an intra prediction mode of a current block;
generating a prediction block of the current block by performing intra prediction on the current block on the basis of the intra prediction mode;
deciding whether the intra prediction mode of the current block is a predetermined intra prediction mode; and
encoding, on the basis of a result of the decision, a most frequent mode (MFM) indicator,
wherein the MFM indicator is set to a first value to indicate that the intra prediction mode of the current block is to be the predetermined intra prediction mode,
wherein the MFM indicator is set to a second value to indicate that the intra prediction mode of the current block is to be derived on the basis of a most probable mode (MPM) list if a predetermined condition is satisfied, the MPM list constructed on the basis of intra prediction modes of neighboring blocks of the current block, and
wherein the MFM indicator is encoded to a bitstream only when a MPM indicator related to a most probable mode has a predetermined value.

4. The image encoding method of claim 3, wherein the predetermined intra prediction mode is a Planar mode.

5. A non-transitory computer-readable recording medium storing program instructions for transmitting a bitstream, the program instructions comprising:
an instruction to generate the bitstream; and
an instruction to transmit the bitstream,
wherein generating the bitstream comprises:
determining an intra prediction mode of a current block;
generating a prediction block of the current block by performing intra prediction on the current block on the basis of the intra prediction mode;
deciding whether the intra prediction mode of the current block is a predetermined intra prediction mode; and
encoding, on the basis of a result of the decision, a most frequent mode (MFM) indicator,
wherein the MFM indicator is set to a first value to indicate that the intra prediction mode of the current block is to be the predetermined intra prediction mode,
wherein the MFM indicator is set to a second value to indicate that the intra prediction mode of the current block is to be derived on the basis of a most probable mode (MPM) list if a predetermined condition is satisfied, the MPM list constructed on the basis of intra prediction modes of neighboring blocks of the current block, and
wherein the MFM indicator is encoded to a bitstream only when a MPM indicator related to a most probable mode has a predetermined value.

\* \* \* \* \*